US010486902B2

(12) United States Patent
Itoh et al.

(10) Patent No.: US 10,486,902 B2
(45) Date of Patent: Nov. 26, 2019

(54) ARTICLE STORAGE APPARATUS AND ARTICLE MOVING DEVICE

(71) Applicant: ITOH DENKI CO., LTD., Kasai-shi, Hyogo (JP)

(72) Inventors: Kazuo Itoh, Kasai (JP); Tatsuhiko Nakamura, Hyogo (JP); Kazuwo Miki, Himeji (JP)

(73) Assignee: Itoh Denki Co., Ltd. (JP)

( * ) Notice: Subject to any disclaimer, the term of this patent is extended or adjusted under 35 U.S.C. 154(b) by 168 days.

(21) Appl. No.: 15/533,723

(22) PCT Filed: Dec. 16, 2015

(86) PCT No.: PCT/JP2015/085228
§ 371 (c)(1),
(2) Date: Jun. 7, 2017

(87) PCT Pub. No.: WO2016/098813
PCT Pub. Date: Jun. 23, 2016

(65) Prior Publication Data
US 2017/0334643 A1 Nov. 23, 2017

(30) Foreign Application Priority Data
Dec. 17, 2014 (JP) ................................ 2014-255603

(51) Int. Cl.
*B65G 1/04* (2006.01)
*B65G 1/00* (2006.01)

(52) U.S. Cl.
CPC ............. *B65G 1/0492* (2013.01); *B65G 1/00* (2013.01); *B65G 1/04* (2013.01); *B65G 1/0478* (2013.01)

(58) Field of Classification Search
CPC .................................................. B65G 1/0492
See application file for complete search history.

(56) References Cited

U.S. PATENT DOCUMENTS 5,069,592 A    12/1991    Galperin
5,370,492 A    12/1994    Gleyze et al.
(Continued)

FOREIGN PATENT DOCUMENTS

CN    103 896 000 A    7/2014
EP    1086910 A1    3/2001
(Continued)

OTHER PUBLICATIONS

International Preliminary Report on Patentability and Written Opinion, dated Jun. 20, 2017, in Appln. No. PCT/JP2015/085228.
(Continued)

*Primary Examiner* — Jonathan Snelting
(74) *Attorney, Agent, or Firm* — Wood, Phillips, Katz, Clark & Mortimer

(57) ABSTRACT

Provided is an article storage apparatus capable of effectively utilizing the capacity of a building. The article storage apparatus includes an article moving device 3. The article moving device 3 includes an X-direction travel wheel 38, a Y-direction travel wheel 48, a travel wheel lifting and lowering unit that lifts and lowers the travel wheels, and an article lifting and lowering unit that lifts and lowers an article. It is possible to lower the X-direction travel wheel 38 or the Y-direction travel wheel 48 so as to be set down on a travel passage by the travel wheel lifting and lowering unit and rotate the set-down travel wheel to cause the article moving device to travel in an X direction or a Y direction. It is possible to lift the article lifting and lowering unit to pick up an article on an article supporting member or lower the article lifting and lowering unit to transfer the article previously lifted by the article lifting and lowering unit onto the article supporting member.

10 Claims, 14 Drawing Sheets

(56) References Cited

U.S. PATENT DOCUMENTS

| | | | | |
|---|---|---|---|---|
| 6,652,213 B1* | 11/2003 | Mitchell | ............ | B65G 1/0492 |
| | | | | 414/279 |
| 7,381,022 B1* | 6/2008 | King | ................ | B65G 1/0492 |
| | | | | 187/270 |
| 9,884,720 B2* | 2/2018 | Van Den Berk | ..... | B65G 1/0492 |
| 2008/0213073 A1* | 9/2008 | Benedict | ............ | B65G 63/004 |
| | | | | 414/279 |
| 2008/0247848 A1* | 10/2008 | Freudelsperger | .... | B65G 1/0492 |
| | | | | 414/277 |
| 2013/0129453 A1 | 5/2013 | Salichs | | |
| 2014/0086714 A1 | 3/2014 | Malik | | |
| 2014/0277693 A1 | 9/2014 | Naylor | | |

FOREIGN PATENT DOCUMENTS

| | | |
|---|---|---|
| EP | 3053855 A2 | 8/2016 |
| FR | 2730715 A1 | 8/1996 |
| JP | 01-176799 A | 7/1989 |
| JP | 6-505690 A | 6/1994 |
| JP | 2001-122404 A | 5/2001 |
| JP | 2009-286599 A | 12/2009 |
| JP | 2013-086917 A | 5/2013 |
| WO | 1993/012998 A1 | 7/1993 |
| WO | 2014/195867 A1 | 12/2014 |

OTHER PUBLICATIONS

International Search Report, dated Feb. 26, 2016 in PCT/JP2015/085228.

Supplementary European Search Report, dated Aug. 10, 2018, in European Patent Application No. EP 15 87 0015.

* cited by examiner

ARTICLE STORAGE APPARATUS AND ARTICLE MOVING DEVICE

TECHNICAL FIELD

The present invention relates to an article storage apparatus. The article storage apparatus of the present invention is used as an automated warehouse or a storage warehouse and relates to an apparatus that stores an article in a predetermined section and carries out an article from a predetermined section.

Further, the present invention relates to a self-propelled article moving device.

BACKGROUND ART

Various types of articles may be stored in one warehouse. In such a case, a shelf is provided inside the warehouse, and an article is conveyed by a truck or a forklift and stored in a predetermined section. When the stored article is required, a truck or the like is moved to the place of the shelf, and the article is taken down from the shelf and carried out. Patent Document 1 discloses an automated warehouse that carries in and out an article by a conveying vehicle.

Further, there is also known an automated warehouse that includes a conveyor device or a stacker crane disposed inside the warehouse and remotely controls the conveyor device or the stacker crane to store an article in a predetermined section or discharge the article from a predetermined section. Patent Document 2 discloses an automated warehouse provided with a stacker crane.

PRIOR ART DOCUMENTS

Patent Documents

Patent Document 1: JP 2013-86917 A
Patent Document 2: JP 2009-286599 A

DISCLOSURE OF INVENTION

Technical Problem

In an automated warehouse, it is, in principle, not necessary for an operator to move and convey an article. Thus, it is possible to manage a large number of articles by a small number of people. However, in a conventional automated warehouse, a conveyor device or a stacker crane occupies a large proportion of the capacity of a building, and the proportion of a capacity that actually contributes to storage of an article is disadvantageously small. Thus, the amount of articles that can be stored inside a building is disadvantageously small.

Thus, the present invention focuses attention on the conventional problem, and an object thereof is to provide an article storage apparatus capable of more effectively utilizing the capacity of a building. Further, it is an object of the present invention to provide an article moving device used in the article storage apparatus.

Solution to Problem

An aspect for solving the above problem is an article storage apparatus including: an article moving device that is self-propelled and that moves an article; and a rack member that places a plurality of the articles thereon, wherein the article moving device includes: an X-direction travel wheel with a posture of allowing the article moving device to travel in an X direction, the X-direction travel wheel having at least one travel wheel; a Y-direction travel wheel with a posture of allowing the article moving device to travel in a Y direction, the Y-direction travel wheel having at least one travel wheel; a travel wheel lifting and lowering unit that lifts and lowers the travel wheel; and an article lifting and lowering unit that lifts and lowers the article, at least one wheel of the X-direction travel wheel being rotatable by power, at least one wheel of the Y-direction travel wheel being rotatable by power, wherein the rack member includes: a travel area having a linear travel passage that linearly extends and supports the travel wheel; and a storage area located beside the linear travel passage, the storage area being divided into a section, the section including: an in-section travel passage that supports the travel wheel; and an article supporting member disposed above the in-section travel passage, wherein the article storage apparatus lowers the X-direction travel wheel or the Y-direction travel wheel to set down on the travel passage with the travel wheel lifting and lowering unit, then rotating the set-down travel wheel to run the article moving device in either X-direction or Y-direction, and wherein the article storage apparatus lowers either the X-direction travel wheel or the Y-direction travel wheel to set down on the linear travel passage in the travel area, rotating the set-down travel wheel to run the article moving device, stopping the article moving device near a desired one of the sections, changing the travel wheel to be set down with the travel wheel lifting and lowering unit, rotating the set-down travel wheel to cause the article moving device to enter the section and travel on the in-section travel passage, thus the article storage apparatus lifting the article lifting and lowering unit to pick up the article on the article supporting member, or lowering the article lifting and lowering unit to transfer the article previously lifted with the article lifting and lowering unit onto the article supporting member.

The wording "X-direction travel wheel" and "Y-direction travel wheel" merely indicates that traveling directions differ from each other, and either one may be an X direction and either one may be a Y direction.

The article storage apparatus of this aspect includes the rack member which is divided into the travel area and the storage area.

The travel area is based on a straight line and includes the linear travel passage. The storage area is located beside the linear travel passage and divided into a plurality of sections.

The article moving device includes the X-direction travel wheel and the Y-direction travel wheel and is capable of lowering the X-direction travel wheel or the Y-direction travel wheel by the travel wheel lifting and lowering unit so as to individually set down the travel wheels on the travel passage. Thus, when the X-direction travel wheel is set down by the travel wheel lifting and lowering unit and rotated, the article moving device travels in the X direction. Further, when the Y-direction travel wheel is set down by the travel wheel lifting and lowering unit and rotated, the article moving device travels in the Y direction.

Thus, the article moving device is capable of traveling in both the X and Y directions.

Thus, the article moving device is capable of traveling on the travel area and stopping in front of any section in the storage area. Further, the article moving device is capable of changing the traveling direction and entering the inside of the storage area.

Further, since the article moving device includes the article lifting and lowering unit which lifts and lowers an article, it is possible to carry an article into the storage area and place the article on the article supporting member. On the other hand, it is also possible to transfer an article placed on the article supporting member to the article moving device, move out of the storage area, and return to the travel area.

In the above aspect, desirably, the article moving device includes a battery and a receiver, and is wirelessly operated.

According to this aspect, wiring is significantly simplified.

In each of the above aspects, desirably, the article storage apparatus further includes a layout storage unit that stores a layout of the rack member, wherein the article moving device is moved on the basis of information stored in the layout storage unit.

According to this aspect, it is sufficient to include a small number of sensors.

In each of the above aspects, desirably, the travel area includes an intersection where a plurality of the linear travel passages intersect in an L shape or a cross shape, and the article storage apparatus is capable of operating the travel wheel lifting and lowering unit to change the travel wheel to be set down in the intersection and rotating the set-down travel wheel to change a traveling direction of the article moving device.

According to this aspect, it is possible to expand the travel area to a wide range.

In each of the above aspects, desirably, the travel area includes an intersection where a plurality of the linear travel passages intersect in an L shape or a cross shape, and the linear travel passages and the intersection form an annular travel passage in the travel area.

According to this aspect, it is possible to expand the travel area to a wide range.

In each of the above aspects, desirably, the rack member is provided on a plurality of floors in a height direction, a lifter moving in an up-down direction is provided, and the article storage apparatus enables the article moving device to enter the lifter, lifts or lowers the lifter to move to an another floor and rotates the travel wheel to move the article moving device to the rack member on the another floor.

According to this aspect, it is possible to three-dimensionally arrange the rack member and effectively utilize a space.

In each of the above aspects, desirably, the travel wheel lifting and lowering unit includes: a swinging member that swings around a swinging shaft; and a cam, the swinging member including: a cam abutment part; and a wheel attachment part to which the travel wheel is attached, and the cam is brought into contact with the cam abutment part to swing the swinging member for lifting or lowering the travel wheel attached to the wheel attachment part.

In each of the above aspects, desirably, the article lifting and lowering unit includes: a rotation shaft; and a cam member attached to the rotation shaft, and the cam member is rotated by rotating the rotation shaft to move a part of the cam member up and down.

in each of the above aspects, desirably, the article storage apparatus includes: a first state where the X-direction travel wheel is set down on the linear travel passage and the Y-direction travel wheel is not set down; and a second state where the Y-direction travel wheel is set down on the linear travel passage and the X-direction travel wheel is not set down, and both the X-direction travel wheel and the Y-direction travel wheel are temporarily set down on the linear travel passage during a change from the first state to the second state, or a change from the second state to the first state.

Further, another aspect is an article moving device that is self-propelled and that travels with an article placed thereon, the article moving device including: an X-direction travel wheel with a posture of allowing the article moving device to travel in an X direction, the X-direction travel wheel having at least one travel wheel; a Y-direction travel wheel with a posture of allowing the article moving device to travel in a Y direction, the Y-direction travel wheel having at least one travel wheel; a travel wheel lifting and lowering unit that lifts and lowers the travel wheel; and an article lifting and lowering unit that lifts and lowers the article, at least one wheel of the X-direction travel wheel being rotatable by power, at least one wheel of the Y-direction travel wheel being rotatable by power, the travel wheel lifting and lowering unit including; a swinging member that swings around a swinging shaft; and a cam, the swinging member including: a cam abutment part; and a wheel attachment part to which the travel wheel is attached, wherein the cam is brought into contact with the cam abutment part to swing the swinging member for lifting or lowering the travel wheel attached to the wheel attachment part, wherein the article moving device lowers the X-direction travel wheel or the Y-direction travel wheel to set down with the travel wheel lifting and lowering unit, then rotating the set-down wheel to run the article moving device in either X-direction or Y-direction, and wherein the article moving device lifts the article lifting and lowering unit to pick up the article on another member or lowers the article lifting and lowering unit to transfer the article previously lifted with the article lifting and lowering unit onto the another member.

In the above aspect, desirably, the article moving device includes: a first state where the X-direction travel wheel is lowered to set down and the Y-direction travel wheel is not set down; and a second state where the Y-direction travel wheel is lowered to set down and the X-direction travel wheel is not set down, and both the X-direction travel wheel and the Y-direction travel wheel are temporarily set down during a change from the first state to the second state, and a change from the second state.

Effect of Invention

The article storage apparatus of the present invention does not necessarily require a conveyor device or the like. Thus, it is possible to ensure a large capacity of an area for storing an article. Thus, the article storage apparatus of the present invention can more effectively utilize the capacity of a building.

Further, when the article moving device of the present invention is used, it is possible to construct an article storage apparatus that more effectively utilizes the capacity, of a building.

BRIEF DESCRIPTION OF DRAWINGS

FIGS. 10A and 10B are conceptual diagrams of a travel wheel lifting and lowering unit of the article moving device of FIG. 4, wherein FIG. 10A illustrates a state in which a travel wheel is on standby at a lifted position and FIG. 10B illustrates a state in which the travel wheel is set down on a travel passage at a lowered position.

BEST MODE FOR CARRYING OUT THE INVENTION

Hereinbelow, an embodiment of the present invention be further described. An article storage apparatus 1 of the present embodiment is constructed inside a building (not illustrated).

Figure 1:
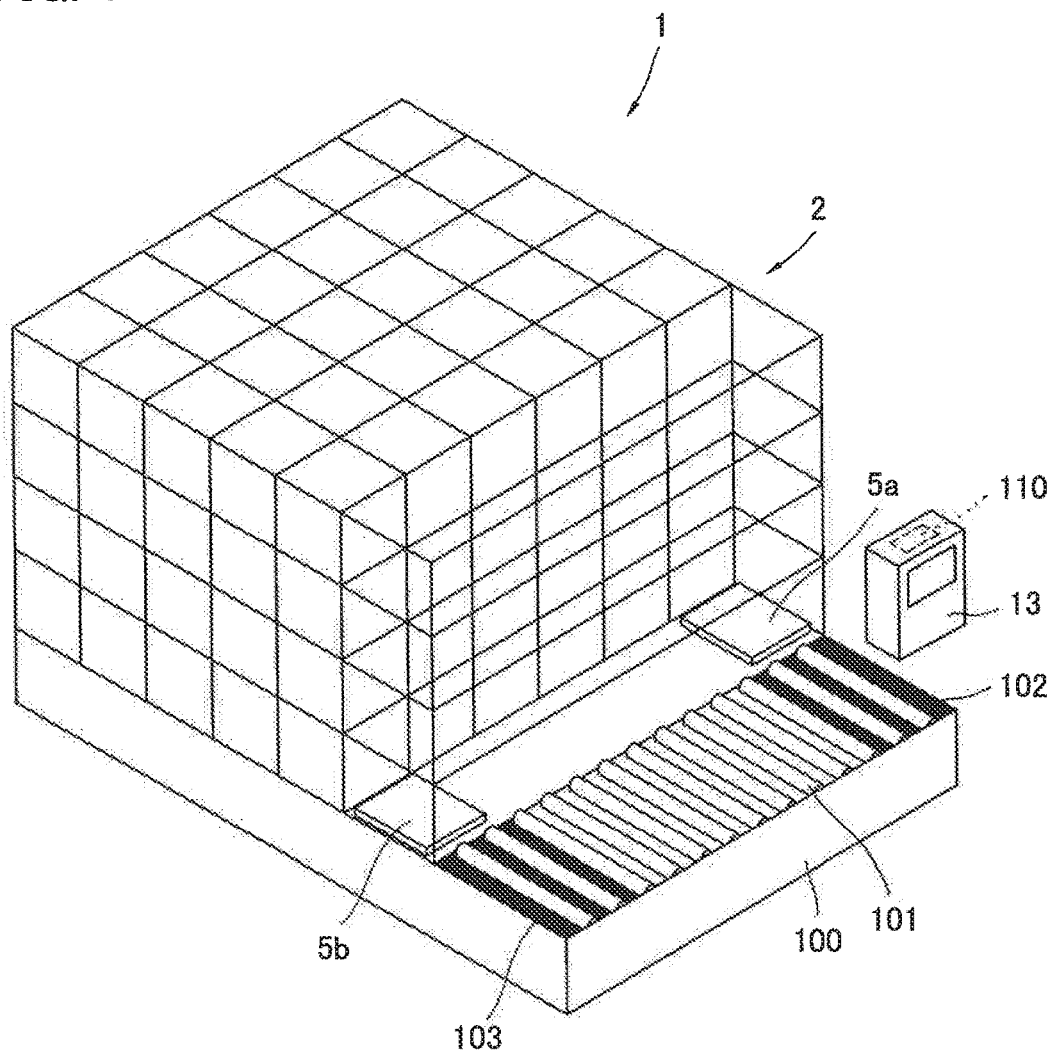
FIG. 1 is a perspective view of a rack member and a carrying-in and discharging device of an article storage apparatus of an embodiment of the present invention.

The article storage apparatus 1 mainly includes a rack member 2 and an article moving device 3 (not illustrated in FIG. 1). Further, a control device 13 is placed near the rack member 2. Further, an introducing and discharging conveyor 100 is disposed on the side face of a first floor part of the rack member 2.

The rack member 2 is one structure as illustrated in FIG. 1. The article moving device 3 (not illustrated in FIG. 1) is a mechanical device. A plurality of article moving devices 3 are incorporated in the rack member 2.

The rack member is made of, for example, a steel material. In the present embodiment, the rack member 2 has a five-floor structure. Further, the rack member 2 is provided with two lifters 5a, 5b. In the present embodiment, one lifter 5a is a carrying-in lifter 5a, and the other lifter 5b is a carrying-out lifter 5b.

Figure 2:
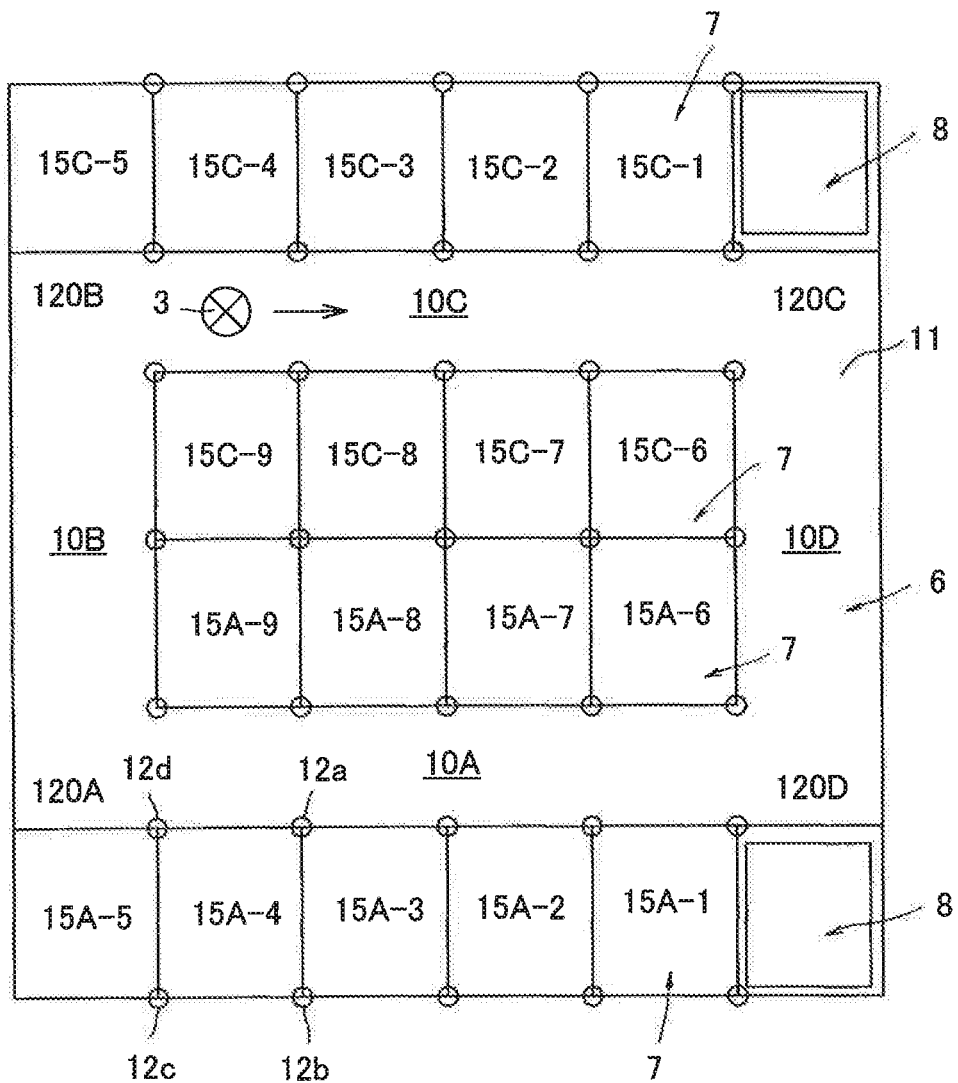
FIG. 2 is a plan view of a specific stage of the rack member of the article storage apparatus of FIG. 1.

Each floor of the rack member 2 is divided into a travel area 6, a storage area 7, and a lift area 8 as illustrated in FIG. 2.

The layout of each floor of the rack member 2 is as illustrated in FIG. 2. The travel area 6 which is provided with an annular travel passage is located on the center, and the storage area 7 is located beside a linear travel passage 10 of the travel area 6, That is, the travel area 6 includes four linear travel passages 10A, 10B, 10C, 10D. The four linear travel passages 10A, 10B, 10C, 10D are arranged in a quadrangular shape and form the annular travel passage as a whole.

For convenience of explanation, based on FIG. 2, the linear travel passage 10A which is located on the lower side of FIG. 2 and extends in a lateral direction is referred to as a first main travel passage 10A. A first sub travel passage 10B, a second main travel passage 10C, and a second sub travel passage 10D are located in a clockwise direction in this order from the first travel passage 10A.

In the present embodiment, intersections 120A, 120B, 120C, and 120D each having an "L" shape are located between the first main travel passage 10A and the first sub travel passage 10B, between the first sub travel passage 10B and the second main travel passage 10C, between the second main travel passage 10C and the second sub travel passage 10D, and between the second sub travel passage 10D and the first main travel passage 10A, respectively.

In the present embodiment, the storage areas 7 are located on both sides of the first main travel passage 10A and the second main travel passage 10C.

That is, the storage areas 7 are located in an area interposed between the first main travel passage 10A and the second main travel passage 10C and in areas on the outer side of the first main travel passage 10A and on the outer side of the second main travel passage 10C.

In the layout, the storage area 7 is located also on one side of the first sub travel passage 10B and on one side of the second sub travel passage 10D. However, in the present embodiment, an article cannot be taken in and out from the side corresponding to each of the sub travel passages 10B, 10D. Thus, in the present embodiment, the storage areas 7 are located only beside the main travel passages 10A, 10C, and the area beside the sub travel passages 10B, 10D does not function as a storage area 7 connected to the sub travel passages 10B, 10C.

Figure 3:
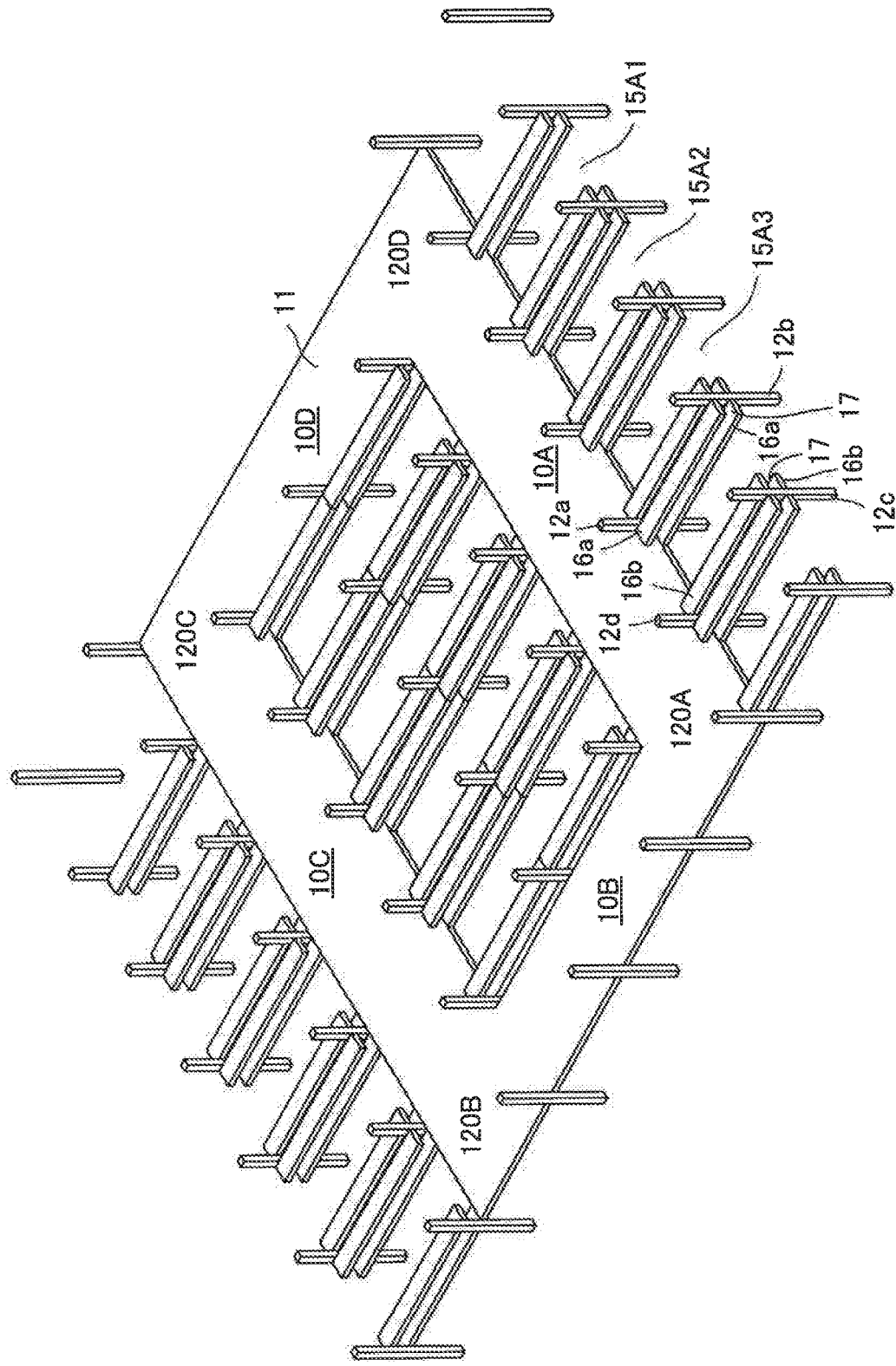
FIG. 3 is a perspective view of the specific stage of the rack member of FIG. 2.
Figure 4:
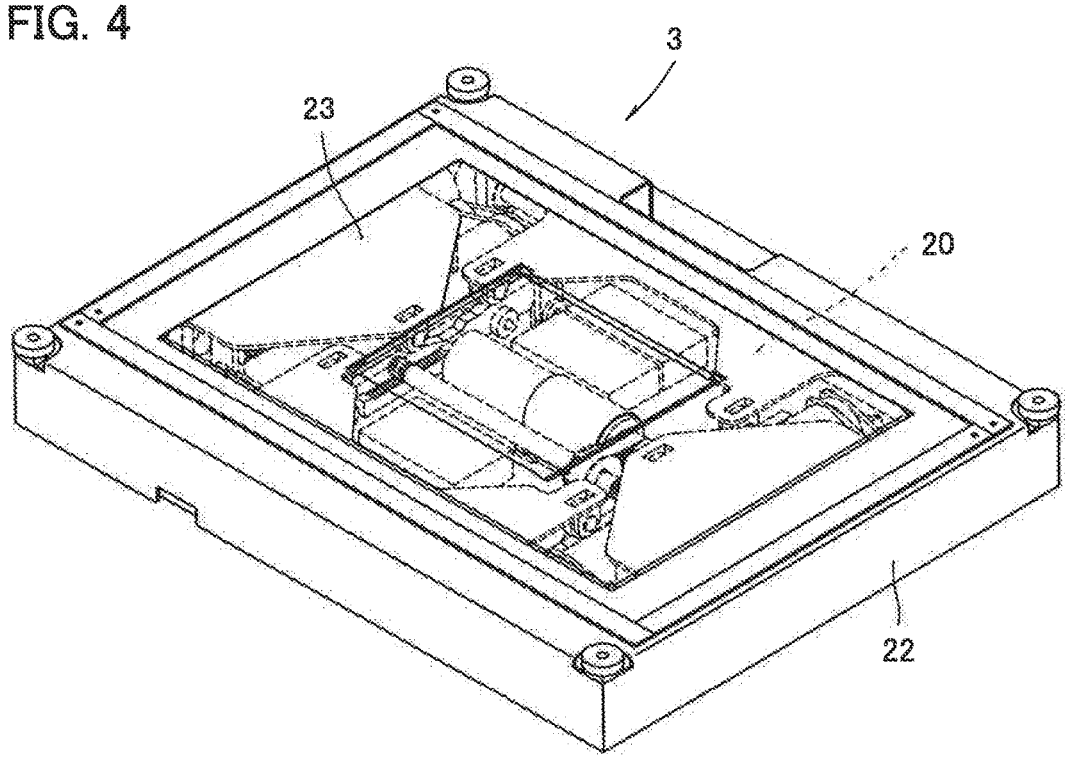
FIG. 4 is a perspective view of an article moving device of the article storage apparatus of the embodiment of the present invention.

As illustrated in FIG. 3, the travel area 6 in each floor of the rack member 2 includes a floor 11. Further, the storage area 7 is divided into a plurality of sections 15 by pillars 12.

That is, an area surrounded by pillars 12a, 12b, 12c, 12d illustrated in FIGS. 2 and 3 is one section. Thus, in the present embodiment, there are eight sections 15 in an area interposed between the first main travel passage 10A and the second main travel passage 10C, and there are five sections 15 on the outer side of the first main travel passage 10A and five sections 1 on the outer side of the second main travel passage 10C.

In the present embodiment, the article moving device 3 comes in and out of the sections 15 from the side facing the main travel passages 10A, 10C.

Each of the sections 15 includes in-section travel passages 17 as illustrated in FIGS. 3 and 11. The in-section travel passages 17 are located at the same height as the floor 11 of the travel area 6 and the in-section travel passages 17 and the floor 11 of the travel area 6 form the same plane. Note that each of the in-section travel passages 17 has a rectangular plate-like shape and is placed in a traveling direction of the article moving device 3. Since the in-section travel passages 17 have a rectangular plate-like shape and are placed in parallel to each other, there is a large opening between the in-section travel passages 17.

Each section 15 is an area surrounded by the pillars 12a, 12b, 12c, 12d. The two pillars 12a, 12d are located at positions facing the main travel passages 10A, 10C, and the other two pillars 12b, 12c are located at the side opposite to the main travel passages 10A, 10C.

In the present embodiment, the article moving device 3 enters each section 15 from the main travel passages 10A, 10C through a position between the two pillars 12a, 12d which face the main travel passages 10A, 10C.

Article supporting members 16a, 16b are disposed in each section 15. The article supporting members 16a, 16b are rectangular plates and located at positions above the in-section travel passages 17 and away from the in-section travel passages 17 in the height direction. A height between the in-section travel passages 17 and the article supporting members 16a, 16b is a height that allows the article moving device 3 to pass therethrough.

The article supporting member 16a is attached to the pillars 12a, 12b. The article supporting member 16a has a shelf shape and is in a cantilever state from the pillars 12a, 12b. The article supporting member 16a is disposed parallel to the in-section travel passage 17. The article supporting member 16b is attached to the pillars 12c, 12d and in a cantilever state from the pillars 12c, 12d. The article supporting member 16b is disposed parallel to the in-section travel passage 17.

That is, the article supporting members 16a, 16b are horizontally disposed from positions facing the main travel passages 10A, 10C toward the back side. In other words, the article supporting members 16a, 16b are disposed along the movement direction of the article moving device 3.

Further, as illustrated in FIGS. 3 and 11, there is a large gap between the article supporting member 16a on one side and the article supporting member 16b on the other side.

As described above, the article moving device 3 comes in and out of the sections 15 from the side facing the main travel passages 10A, 10C. Thus, for convenience of explanation, reference signs A, C of the main travel passages 10A, 10C are appended, and serial numbers are further appended to distinguish between the sections 15. Specifically, for convenience of explanation, addresses such as the section 15A-1 and the section 15C-1 are appended.

For example, the numbered section surrounded by the pillars 12a, 12b, 12c, 12d in FIGS. 2 and 3 is the fourth section facing the main travel passage 10A and denoted by the section 15A-4.

Figure 16:
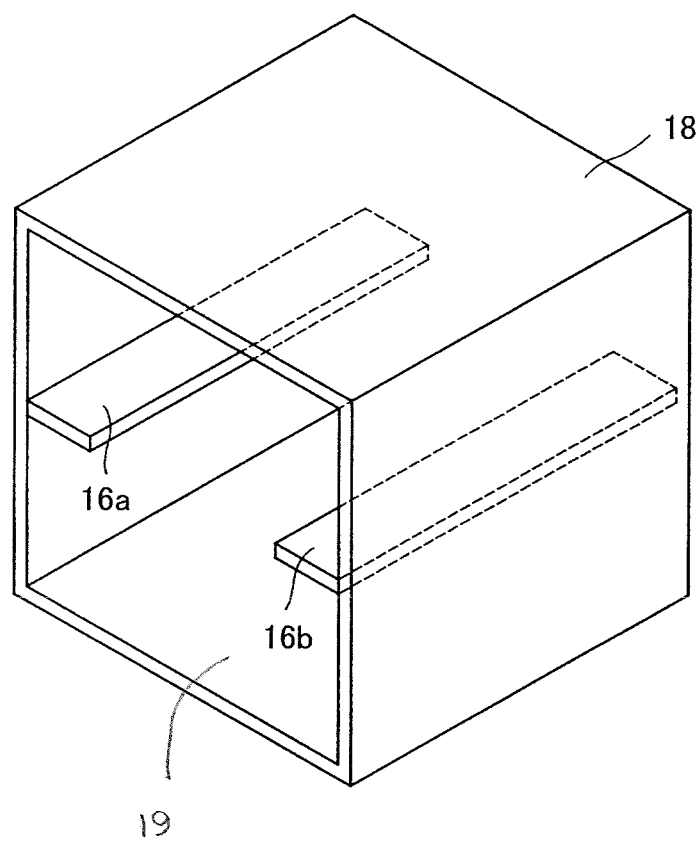
FIG. 16 is a perspective view of a gondola.

The lifters 5 hang a gondola 18 as illustrated in FIG. 16 through a chain (not illustrated), and lift and lower the gondola 18. The lifters 5 are disposed on two corners of the rack member 2.

As illustrated in FIG. 16, also the gondola 18 is provided with article supporting members 16a, 16b similarly to the section 15. The gondola 18 includes a floor 19, and the article moving device 3 is placed on the floor 19.

Further, the introducing and discharging conveyor 100 is disposed on the side face of the first floor part of the rack member 2. The introducing and discharging conveyor 100 includes a linear conveyor unit 101, and transfer devices 102, 103 which are disposed on opposite ends of the linear conveyor unit 101. The transfer devices 102, 103 have a function of changing an article conveying direction and are capable of selectively conveying an article in a straight direction and an intersecting direction.

Next, the article moving device 3 will be described.

The article moving device 3 has a function of lifting and lowering an article and a self-propelled function. The article moving device 3 is capable of traveling straight in the vertical direction and the lateral direction.

Figure 5:
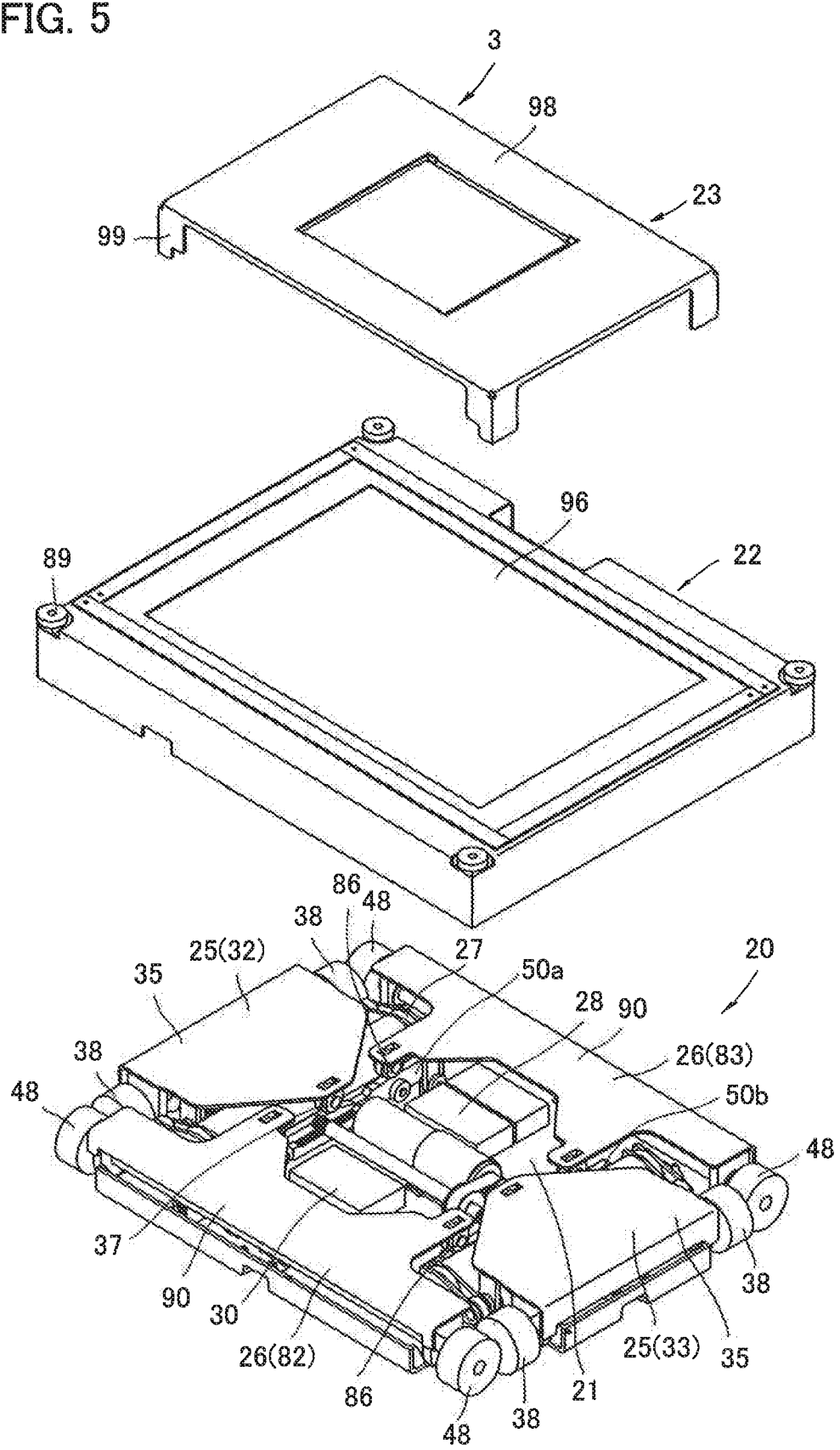
FIG. 5 is an exploded perspective view of the article moving device of FIG. 4.

As illustrated in FIG. 5, the article moving device 3 mainly includes a mechanical structure part 20, a body part 22, and a holding member 23.

Figure 6:
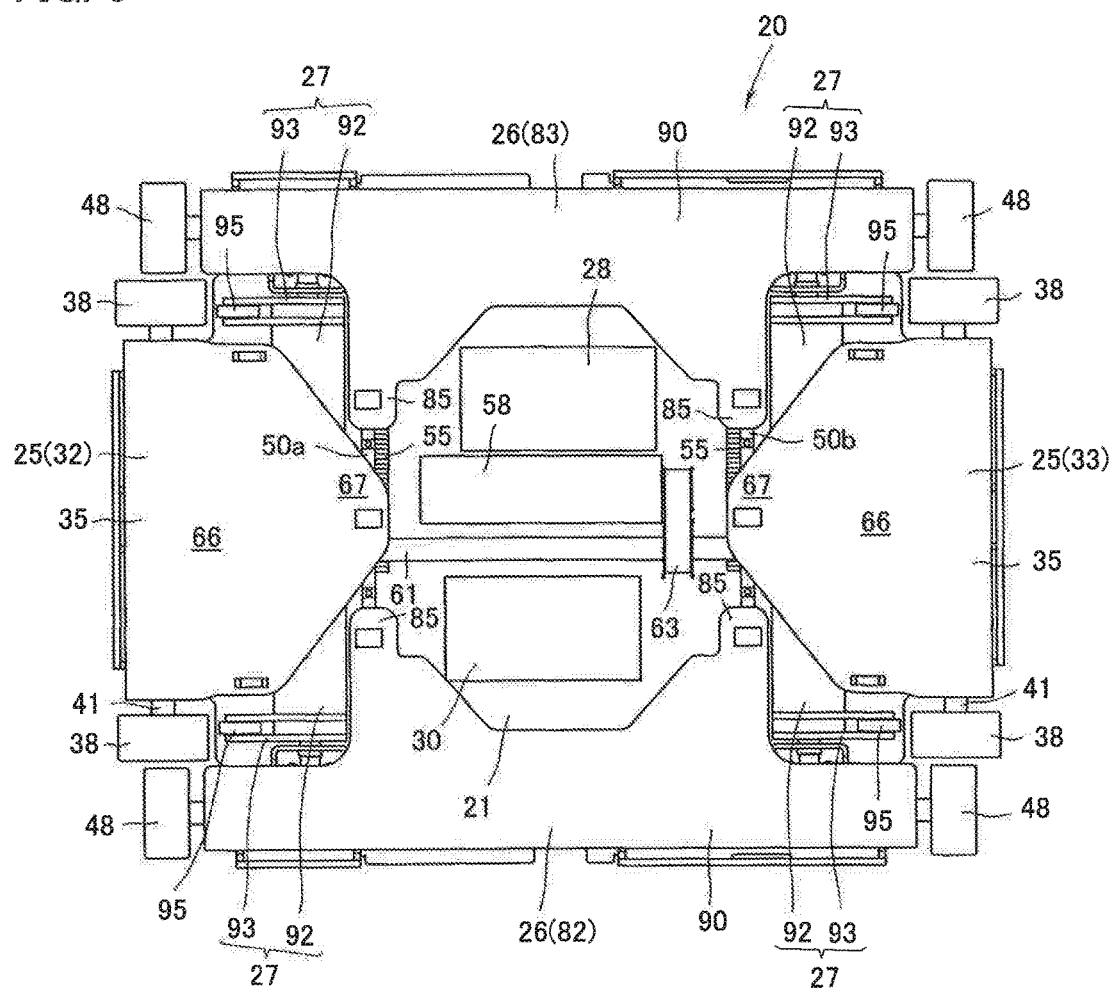
FIG. 6 is a plan view of a mechanical structure part of the article moving device of FIG. 4.

As illustrated in FIGS. 5 and 6, the mechanical structure part 20 includes an X-direction travel mechanism 25, a Y-direction travel mechanism 26, article lifting and lowering units 27, translation cams 50a, 50b, a storage battery 28, and a receiver 30 all of which are disposed on a plate-like frame 21.

Figure 9:
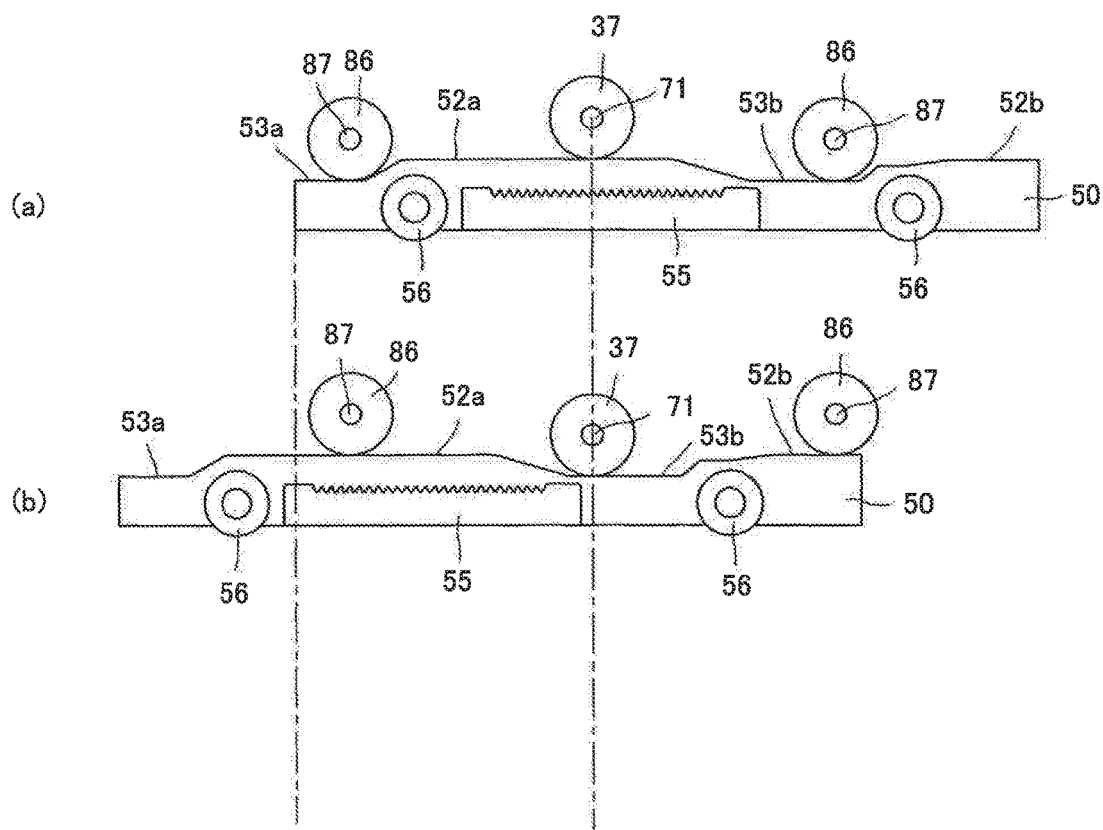
FIG. 9 is an explanatory diagram illustrating the relationship between a translation cam, the X-direction travel mechanism, and a cam follower which belongs to the X-direction travel mechanism in the article moving device of FIG. 4.
Figure 10A:
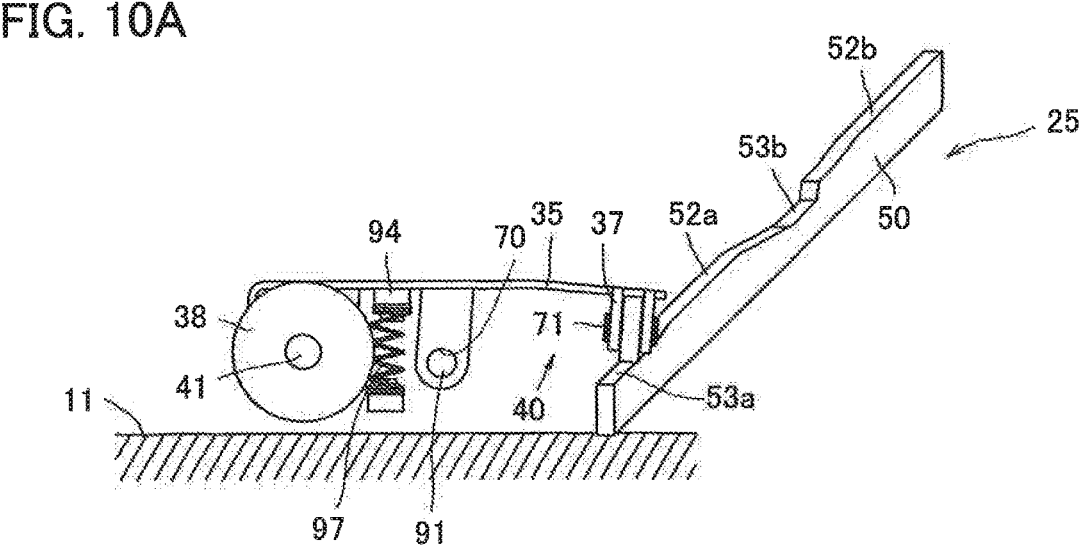
Figure 10B:
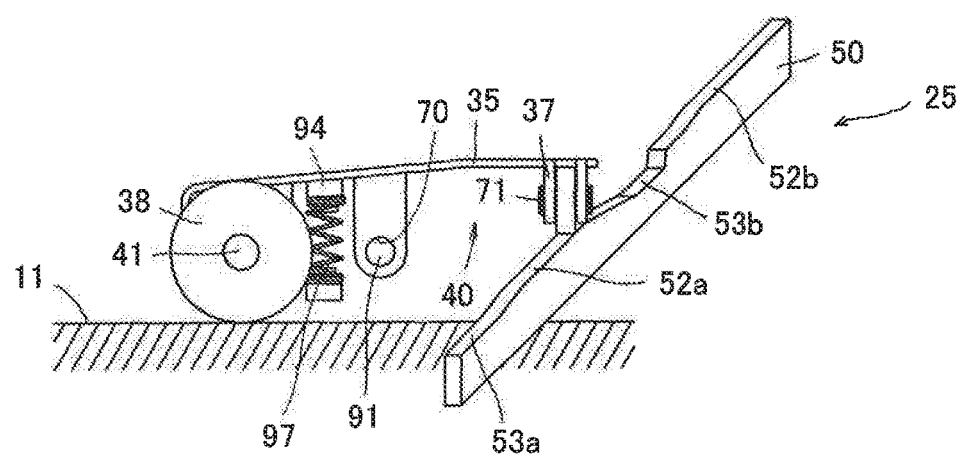

As illustrated in FIGS. 9 and 10, each of the translation cams 50a, 50b includes two highland parts 52a, 52b and two valley parts 53a, 53b which are adjacent to the highland parts 52a, 52b.

Figure 15:
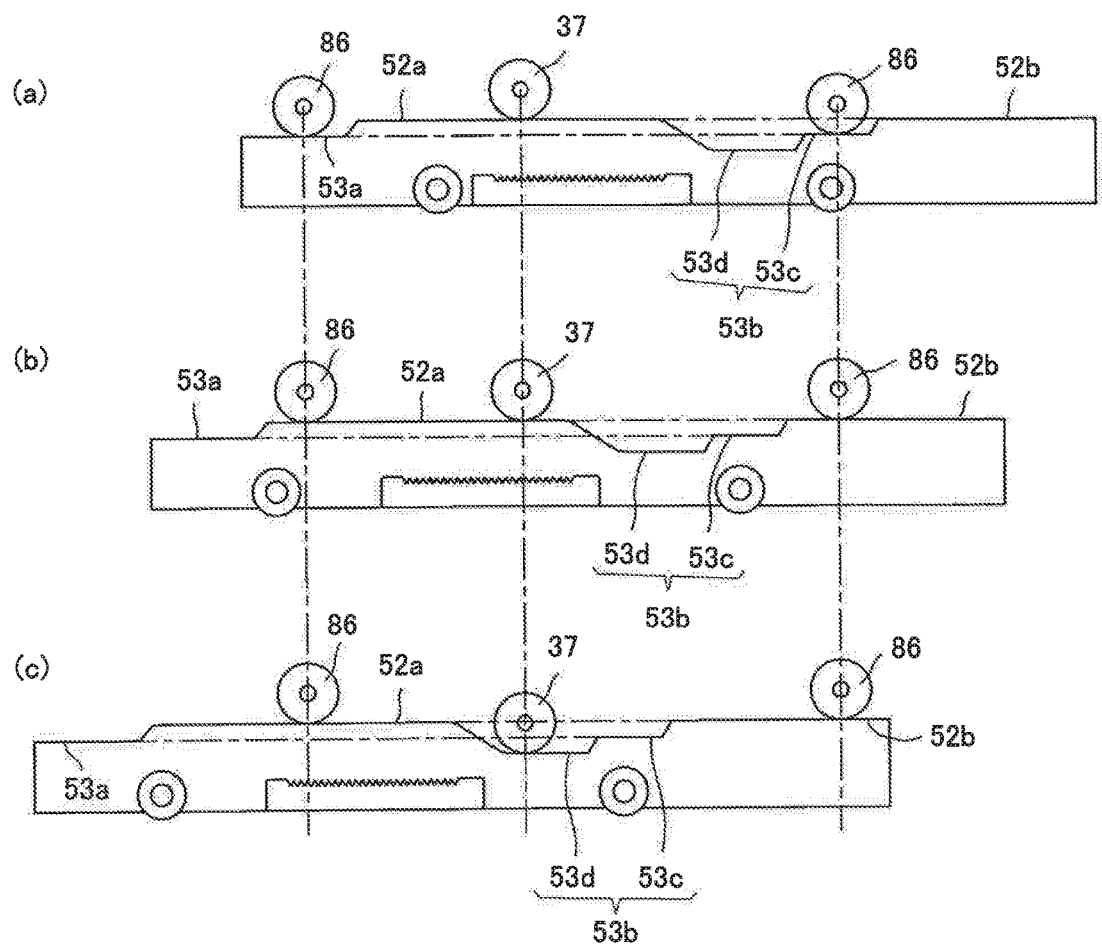
FIG. 15 is an explanatory diagram more specifically illustrating the relationship between the translation cam, X-direction travel mechanism, and the cam follower which belongs to the X-direction travel mechanism in the article moving device of FIG. 4.

FIG. 15 illustrates the translation cams 50a, 50b in more detail.

In the present embodiment, the valley part 53b interposed between the highland parts 52a, 52b includes a middle depth valley part 53c having a middle depth and a deepest valley part 53d which is deeper than the middle depth valley part 53c.

In the height relationship between the translation cams 50a, 50b, the two highland parts 52a, 52b have the same height and they are the highest parts in the translation cams 50a, 50b.

The deepest valley part 53d is the lowest part in the translation cams 50a, 50b.

The valley part 53a and the middle height valley part 53c have the same height, and are lower than the highland parts 52a, 52b and higher than the deepest valley part 53d.

Figure 7:
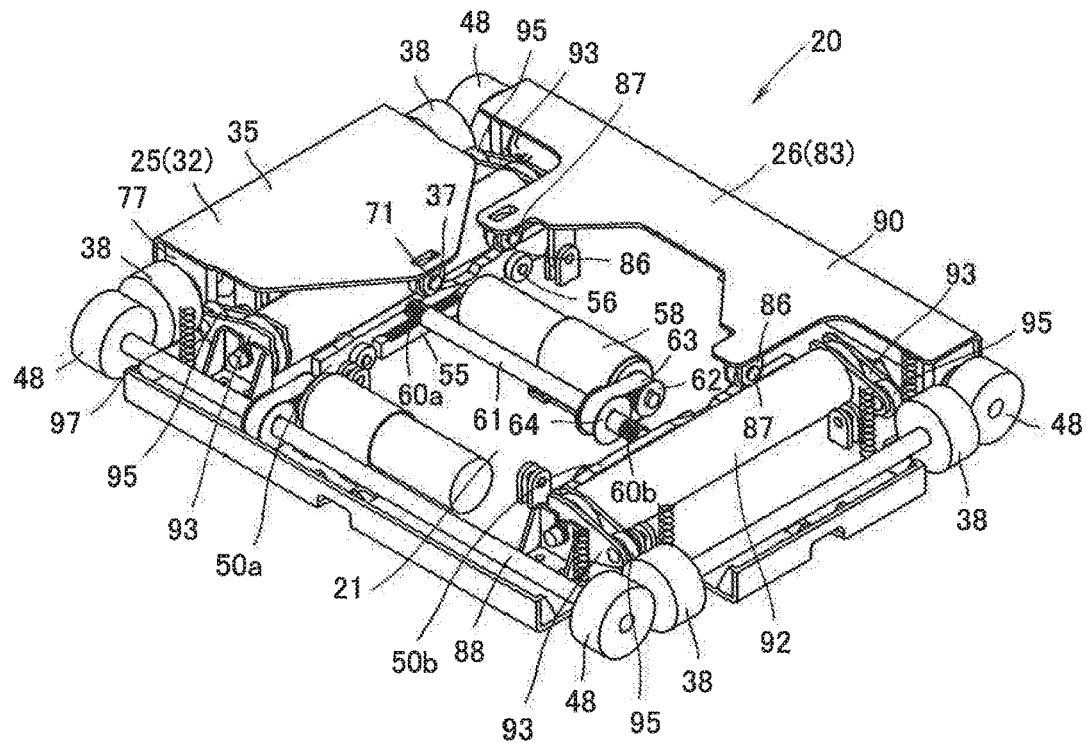
FIG. 7 is a perspective view of a part of the mechanical structure part of the article moving device of FIG. 4.
Figure 8:
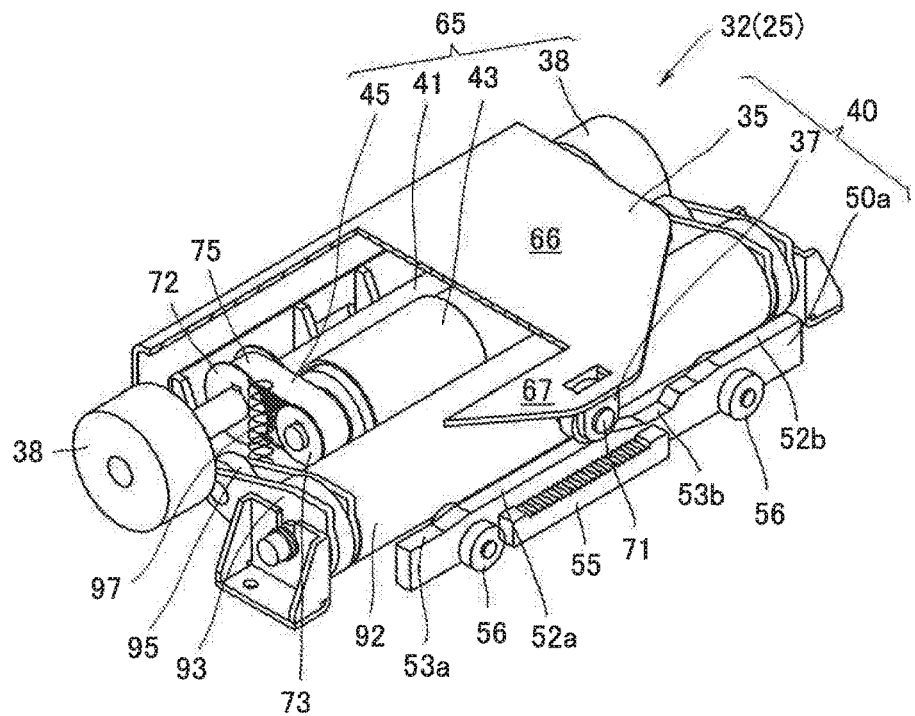
FIG. 8 is a partial sectional perspective view of an X-direction travel mechanism of the article moving device of FIG. 4.

As illustrated in FIGS. 7, 8, and 9, each of the translation cams 50a, 50b is provided with short rollers 56, and the short rollers 56 are engaged with a guide (not illustrated). Thus, the translation cams 50a, 50b move only in the longitudinal direction with respect to the frame 21.

Further, as illustrated in Figs. 7, 8, and 9, each of the translation cams 50a, 50b is provided with a rack 55. As illustrated in Fig. 7, pinion gears 60 are engaged with the racks 55 of the translation cams 50a, 50b. The pinion gears 60a, 60b which are respectively engaged with the two translation cams 50a, 50b are coupled through a coupling shaft 61 as illustrated in Fig. 7 so that the pion gears 60a, 60b integrally rotate.

Further, as illustrated in FIG. 7, a cam driving motor (geared motor) 58 is disposed on the center of the frame 21 with an attitude of an output shaft thereof facing the translation cam 50a. Further, toothed pulleys 62, 64 are connected to the output shaft of the cam driving motor 58 and the coupling shaft 61, respectively. A toothed belt 63 is wound around the toothed pulleys 62, 64.

Thus, when the cam driving motor 58 is rotated, a rotary force thereof is transmitted to the coupling shaft 61 through the toothed pulley 62, the toothed belt 63, and the toothed pulley 64, and the pinion gears 60a, 60b which are disposed on the opposite ends of the coupling shaft 61 synchronously rotate.

Accordingly, the racks 55 which are engaged with the pinion gears 60a, 60b and the translation cams 50a, 50b which are integrated with the racks 55 linearly move.

As illustrated in FIG. 7, the translation cams 50a, 50b are disposed parallel to two opposite sides of the frame 21. The translation cam 50a is located at one side of the frame 21, and the translation cam 50b is located at the other side of the frame 21.

Next, the X-direction travel mechanism 25 will be described. As illustrated in FIGS. 8 and 9, the X-direction travel mechanism 25 includes X-direction travel wheels 38 and travel wheel lifting and lowering units 40.

The X-direction travel mechanism 25 includes an X-direction travel device (driving side) 32 and an X-direction travel device (driven side) 33 which are disposed on two opposite sides of the frame 21.

As illustrated in FIG. 8, the X-direction travel device (driving side) 32 includes the travel wheel lifting and lowering unit 40 which includes a swinging member 35, the translation cam 50a and a cam follower (cam abutment part) 37, and a travel mechanism 65 which includes an axle 41, the X-direction travel wheels 38, a geared motor 43 and a power transmission mechanism 45.

As illustrated in FIG. 6, the swinging member 35 has a home base shape in plan view in which one end side thereof has a shape tapered toward the center. That is, the plane shape of the swinging member 35 includes a large area part 66 having a large width and a region which has a tapered shape and includes a corner 67.

A swinging shaft hole 70 for inserting a swinging shaft 91 (FIG. 10) is formed on the back face side of the swinging member 35. Further, as illustrated in FIG. 8, the cam follower 37, the axle 41, the X-direction travel wheels 38, and the geared motor 43 are also attached to the back face side of the swinging member 35.

The cam follower 37 is disposed on the corner 67 having a tapered shape on the back face side of the swinging member 35.

The cam follower 37 is a short roller which freely rotates and includes a rotation shaft 71 which is disposed in a direction perpendicular to the axle 41. The rotation shaft 71 extends in a direction intersecting the translation cam 50 when the attitude of the rotation shaft 71 is described in the relationship with the translation cam 50. Thus, the cam follower 37 rotates along the longitudinal direction of the translation cam 50.

As illustrated in FIG. 7, the swinging member 35 includes a travel wheel attachment part 77 on the back face side thereof, and each of the X-direction travel wheels 38 is attached to the travel wheel attachment part 77.

Specifically, as illustrated in FIG. 8, the axle 41 is located on the back face side of the swinging member 35. As illustrated in FIG. 10, the axle 41 is attached at the side opposite to the cam follower 37 across the swinging shaft hole 70. The axle 41 is attached to the back face side of the swinging member 35 through a bearing (not illustrated) and rotatable with respective to the swinging member 35.

The X-direction travel wheels 38 described above are integrally attached to the opposite ends of the axle 41.

Further, as illustrated in FIG. 8, the geared motor 43 described above is attached parallel to the axle 41. The geared motor 43 and the axle 41 are connected through the power transmission mechanism 45.

More specifically, toothed pulleys 72, 73 are attached to the axle 41 and the geared motor 43, respectively, and a toothed belt 75 is wound around the toothed pulleys 72, 73.

Thus, when the geared motor 43 is rotated, a rotary force thereof is transmitted to the axle 41 by the power transmission mechanism 45, so that the X-direction travel wheels 38 which are attached to the opposite ends of the axle 41 rotate.

The X-direction travel device (driving side) 32 which constitutes one side of the X-direction travel mechanism 25 has been described above. Next, the X-direction travel device (driven side) 33 on the other side will be described.

The structure of the X-direction travel device (driven side) 33 is basically the same as the structure of the X-direction travel device (driving side) 32 described above except that the X-direction travel device (driven side) 33 includes no driving mechanism. That is, the X-direction travel device (driven side) 33 is the same as the X-direction travel device (driving side) 32 from which the geared motor 43 and the power transmission mechanism 45 are eliminated.

Next, the Y-direction travel mechanism 26 will be described. The Y-direction travel mechanism 26 includes Y-direction travel wheels 48 and the travel wheel lifting and lowering units (not illustrated).

The Y-direction travel mechanism 26 also includes a Y-direction travel device (driving side) 82 and a Y-direction travel device (driven side) 83 which are disposed on two opposite sides of the frame 21.

The two sides of the frame 21 to which the Y-direction travel mechanism 26 is attached are perpendicular to the sides to which the X-direction travel mechanism 25 is attached.

A mechanism of the Y-direction travel device (driving side) 82 and the Y-direction travel device (driven side) 83 of the Y-direction travel mechanism 26 is the same as that of the X-direction travel device (driving side) 32 and the X-direction travel device (driven side) 33 of the X-direction travel mechanism 25 (described above).

Thus, only a difference between the Y-direction travel mechanism 26 and the X-direction travel mechanism 25 will be described.

The Y-direction travel device (driving side) 82 also includes a swinging member 90 as illustrated in FIG. 7. As illustrated in FIGS. 5, 6, and 7, the plane shape of the swinging member 90 has two projections 85. In the Y-direction travel device (driving side) 82, cam followers (cam abutment parts) 86 are disposed on the back face side of the two projections 85.

Each of the cam followers 86 is a short roller which freely rotates and includes a rotation shaft 87 which is disposed parallel to an axle 88. The rotation shaft 87 extends in a direction intersecting the translation cam 50 when the attitude of the rotation shaft 87 is described in the relationship with the translation cam 50. Thus, the cam follower 86 rotates along the longitudinal direction of the translation cam 50.

The Y-direction travel device (driven side) 83 has the same structure as the Y-direction travel device (driving side) 82 except that the Y-direction travel device (driven side) 83 has no driving mechanism.

Next, the article lifting and lowering unit 27 will be described. The article lifting and lowering unit 27 includes a geared motor 92 and cam members 93.

The geared motor 92 includes output shafts which project from opposite ends of the geared motor 92. The cam members 93 are attached to the respective output shafts on the opposite ends.

Each of the cam members 93 employed in the present embodiment has an arm shape and includes a short roller 95 which is attached to the tip thereof. When the geared motor 92 is rotated, each of the cam members 93 rotates, and the region of the short roller 95 is lifted and lowered with a circular arc track.

The storage battery 28 and the receiver 30 are known. Thus, detailed description thereof will be omitted.

Next, the relationship between the above members will be described.

As described above, the mechanical structure part 20 includes the X-direction travel mechanism 25, the Y-direction travel mechanism 26, the article lifting and lowering units 27, the translation cams 50a, 50b, the storage battery 28, and the receiver 30 all of which are disposed on the plate-like frame 21.

As described above, the translation cams 50a, 50b are disposed parallel to the two opposite sides of the frame 21. The translation cam 50a is located at the one side of the frame 21, and the translation cam 50b is located at the other side of the frame 21. The translation cams 50a, 50b are linearly movable parallel to one side of the frame 21 and the side opposite to the one side.

The cam driving motor 58 which drives the translation cams 50a, 50b, the coupling shaft 61, the toothed pulleys 62, 64, and the toothed belt 63 are disposed in an area interposed between the two translation cams 50a, 50b.

Further, the storage battery 28 and the receiver 30 are disposed in this area.

As described above, the X-direction travel mechanism 25 includes the X-direction travel device (driving side) 32 and the X-direction travel device (driven side) 33 which are disposed on the two opposite sides of the frame 21.

The X-direction travel device (driving side) 32 and the X-direction travel device (driven side) 33 are attached to the frame 21 through the swinging shafts 91.

That is, the swinging shafts 91 are fixed to the frame 21 by a supporting member (not illustrated) and inserted into the swinging shaft holes 70 of the swinging members 35 of the X-direction travel device (driving side) 32 and the X-direction travel device (driven side) 33. Thus, each of the swinging member 35 swings around the swinging shaft 91.

Further, the cam followers 37 of the swinging members 35 of the X-direction travel device (driving side) 32 and the X-direction travel device (driven side) 33 are in contact with the translation cams 50a, 50b.

In the present embodiment, pressing members such as springs 97 are disposed on the back face side of the swinging members 35 and bias the swinging members 35 in a direction that brings the cam followers 37 into contact with the translation cams 50a, 50b.

More specifically, each of the swinging members 35 includes a spring attachment seat 94 (FIG. 10) which is disposed on the back face side of the swinging member 35 at the side opposite to the cam follower 37 with respect to the swinging shaft 91, and the spring 97 is attached in a compressed state between the spring attachment seat 94 and the frame 21. Thus, the cam followers 37 are biased downward by the springs 97 and press the translation cams 50a, 50b.

On the other hand, in the relationship with the X-direction travel wheel 38, the spring 97 is located between the axle 41 and the swinging shaft 91 and presses the swinging member 35 upward. Thus, the X-direction travel wheel 38 is constantly biased upward.

As described above, the Y-direction travel mechanism 26 includes the Y-direction travel device (driving side) 82 and the Y-direction travel device (driven side) 83 which are disposed on the two opposite sides of the frame 21.

The relationship between the Y-direction travel mechanism 26 and the frame 21 is the same as the relationship between the X-direction travel mechanism 25 described above and the frame 21. The Y-direction travel mechanism 26 is attached to the frame 21 through a swinging shaft (not illustrated), and the swinging member 90 swings around the swinging shaft.

Further, the two cam followers 86 of each of the swinging members 90 of the Y-direction travel device (driving side) 82 and the Y-direction travel device (driven side) 83 are in contact with the translation cams 50a, 50b.

Also in the Y-direction travel mechanism 26, pressing members such as springs are disposed on the back face side of the swinging members 90 and bias the swinging members 90 in a direction that brings the cam followers 86 into contact with the translation cam 50a, 50b. Further, each of the springs is located between the axle 88 and the swinging shaft and presses the swinging member 90 upward. Thus, the Y-direction travel wheel 48 is constantly biased upward.

In the present embodiment, the cam followers 37 of the X-direction travel mechanism 25 and the cam followers 86 of the Y-direction travel mechanism 26 are all in contact with the translation cams 50a, 50b as illustrated in FIG. 9.

Further, each of the translation cams 50a, 50b includes the highland parts 52a, 52b and the valley parts 53a, 53b. Each of the translation cams 50a, 50b linearly moves by rotating the cam driving motor 58. Thus, there are a state in which the cam follower 37 of the X-direction travel mechanism 25 is located on the highland part 52a and the cam followers 86 of the Y-direction travel mechanism 26 fall into the valley parts 53a, 53b (the middle height valley part 53c) as illustrated in FIGS. 9(a) and 15(b) and a state in which the cam follower 37 of the X-direction travel mechanism 25 falls into the valley part 53b (the deepest valley part 53d) and the cam followers 86 of the Y-direction travel mechanism 26 climb onto the highland parts 52a, 52b as illustrated in FIGS. 9(b) and 15(c) according to the positions of the translation cams 50a, 50b.

As illustrated in FIG. 15(b), there is a timing when all the cam followers 37, 86 climb on the highland parts 52a, 52b between the state of FIGS. 9(a) and 15(a), and the state of FIGS. 9(b) and 5(c).

In the state in which the cam follower 37 of the X-direction travel mechanism 25 is located at the highland part 52a and the cam followers 86 of the Y-direction travel mechanism 26 fall into the valley parts 53a, 53b (the middle height valley part 53c) as illustrated in FIGS. 9(a) and 15(a), the Y-direction travel wheels 48 of the Y-direction travel mechanism 26 move upward, and the X-direction travel wheels 38 of the X-direction travel mechanism 25 move downward and make a landing.

On the other hand, when the cam follower 37 of the X-direction travel mechanism 25 falls into the valley part 53b (the deepest valley part 53d) and the cam followers 86 of the Y-direction travel mechanism 26 climb onto the highland parts 52a, 52b as illustrated in FIGS. 9(b) and 15(c), the Y-direction travel wheels 48 of the Y-direction travel mechanism 26 move downward and make a landing, and the X-direction travel wheels 38 of the X-direction travel mechanism 25 move upward.

Further, in the process thereof, when all the cam followers 37, 86 climb on the highland parts 52a, 52b as illustrated in FIG. 15(b), the X-direction travel wheels 38 and the Y-direction travel wheels 48 are all brought into a lowered state and set down on the travel passage 10 or the like.

Further, in the present embodiment, the article lifting and lowering units 27 are placed under the swinging members 35 of the X-direction travel device (driving side) 32 and the X-direction travel device (driven side) 33. More specifically, the geared motor 92 of each of the article lifting and lowering units 27 is disposed between each of the translation cams 50a, 50b and the swinging shaft 91 under the corresponding swinging member 35.

Further, each of the cam members 93 of the article lifting and lowering unit 27 is located between the swinging member 35 of the X-direction travel mechanism 25 and the swinging member 90 of the Y-direction travel mechanism 26. Thus, when the geared motor 92 rotates, the short roller 95 which is a part of the cam member 93 projects upward through a gap between the swinging members 90.

Next, the body part 22 of the article moving device 3 will be described.

The body part 22 is a member that covers a contour of the mechanical structure part 20 and includes five faces except a bottom. A large opening 96 is formed on the top face of the body part 22.

Short rollers 89 are disposed on four corners of the upper part of the body part 22.

As illustrated in FIG. 5, the holding member 23 includes a tray part 98 having a planar shape and guide rods 99 which extend downward from four corners of the tray part 98.

Next, the relationship between the mechanical structure part 20, the body part 22, and the holding member 23 of the article moving device 3 will be described.

In the article moving device 3 of the present embodiment, the body part 22 covers the mechanical structure part 20. Further, the holding member 23 is mounted on the body part 22. The mechanical structure part 20 includes vertical guides (not illustrated), and the guide rods 99 are engaged with the vertical guides of the mechanical structure part 20. Thus, the holding member 23 has flexibility only in the up-down direction with respect to the mechanical structure part 20.

Further, the tray part 98 of the holding member 23 is located at a position that can make contact with the short rollers 95 each of which is a part of the cam member 93 when the geared motors 92 of the article lifting and lowering units 27 rotate. Thus, when the geared motors 92 are rotated to rotate the cam members 93, the short rollers 95 move upward and abut against the bottom of the tray part 98, and push up the tray 98.

Figure 14:
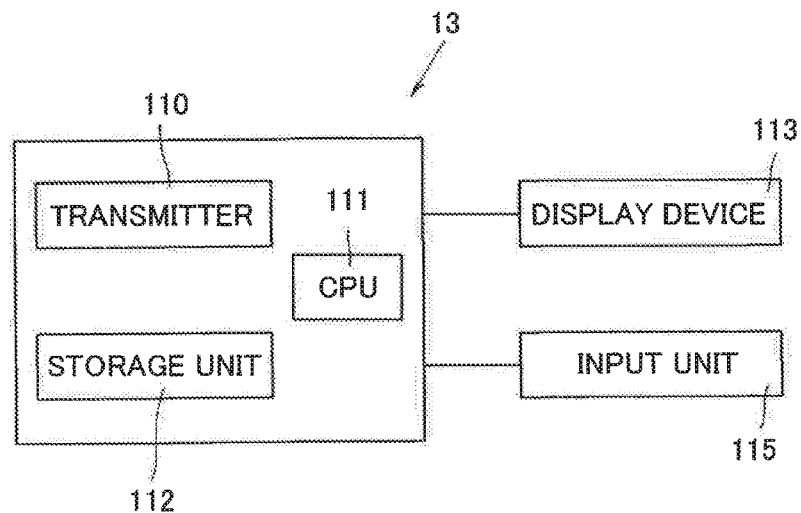
FIG. 14 is a block diagram of a control device.

Next, the control device 13 will be described. As illustrated in FIG. 14, the control device 13 includes a transmitter 110, a CPU 111, and a storage unit 112. Further, a display device 113 and an input unit 115 are connected to the control device 13.

In the present embodiment, the layout of each floor of the rack member 2 is stored in the storage unit 112. Specifically, an address such as the section 15A-1 or the section 15C-1 in each floor and a position (coordinates) are associated with each other and stored.

Further, a program for calculating a route along which the article moving device 3 should move is input to the CPU 111.

Further, a program for changing the places of articles in accordance with the order of carrying out the articles is input to the CPU 111.

The display device 113 displays a vacancy state of each section 15 and an article which is already stored in each section 15. The input unit 115 has a function of inputting a command for taking in and out an article and a function of designating a section that stores an article.

Next, the total function of the article storage apparatus 1 will be described.

The article storage apparatus 1 of the present embodiment carries in and out an article using the control device 13. First, assuming that there is an article in any of the sections 15 of the rack member 2, and a case of discharging the article will be described.

Specifically, it is assumed that there is an article that should be discharged in the section 15A-4, and the article moving device 3 is stopped between the section 15C-4 and the section 15C-9 of the second main travel passage 10C as illustrated in FIG. 2.

In the section 15A-4, an article W is placed on the article supporting members 16a, 16b as illustrated in FIG. 11.

Further, the article moving device 3 is in a state capable of traveling on the second main travel passage 10C. Specifically, as illustrated in FIG. 9(a), the cam follower 37 of the X-direction travel mechanism 25 is located on the highland part 52a and the cam followers 86 of the Y-direction travel mechanism 26 fall into the valley parts 53a, 53b so that the Y-direction travel wheels 48 of the Y-direction travel mechanism 26 are in a lifted state, and the X-direction travel wheels 38 of the X-direction travel mechanism 25 are lowered and landed.

Figure 13A:
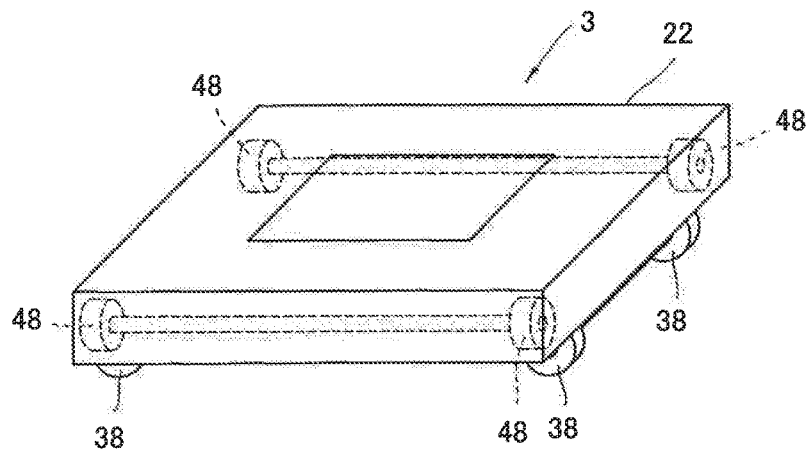
FIGS. 13A is a perspective view of the article moving device illustrating a state in which X-direction travel wheels are lowered.

That is, as illustrated in FIG. 13A, the X-direction travel wheels 38 are exposed under the article moving device 3 and landed on the second main travel passage 10C of the floor 11, and the fir-direction travel wheels 48 are housed inside the body part 22 and not landed.

Further, the short rollers 95 of the cam members 93 of the article lifting and lowering units 27 of the article moving device 3 are located inside the body part 22 of the article moving device 3 and separated from the bottom of the tray part 98 of the holding member 23. Thus, the tray part 98 is in a lowered state and in contact with the top face of the body part 22.

When the input unit 115 of the control device 13 gives a command for discharging the article W in the section 15A-4, a signal thereof is transmitted from the transmitter 110. Then, when the receiver 30 of the article moving device 3 receives the wireless signal, the geared motor 43 of the X-direction travel device (driving side) 32 is energized to rotate the X-direction travel wheels 38.

In the present embodiment, the X-direction travel wheels 38 rotate, and the article moving device 3 travels in a clockwise direction (arrow direction) on the second main travel passage 10C. In the present embodiment, the article moving device 3 travels on the travel passage 10 constantly in one direction (a clockwise direction in the present embodiment).

Further, in the present embodiment, the number of rotations of the X-direction travel wheels 38 is counted. The travel distance of the article moving device 3 is calculated by adding up the number of rotations.

As a result, when the article moving device 3 reaches the intersection 120C between the second main travel passage 10C and the second sub travel passage 10D, the X-direction travel wheels 38 are stopped.

Figure 13B:
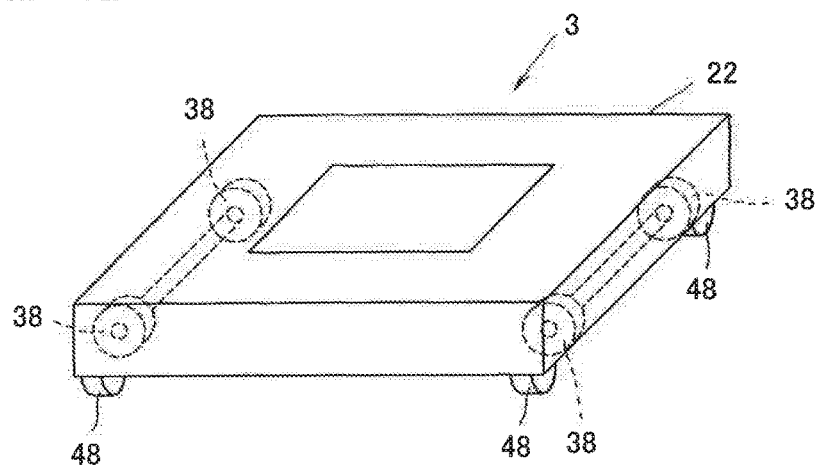
FIG. 13B is a perspective view of the article moving device illustrating a state in which Y-direction travel wheels are lowered.

Then, the travel wheel lifting and lowering units 40 are caused to function to make a change to a state in which the Y-direction travel wheels 48 are exposed under the article moving device 3 and landed on the floor 11, and the X-direction travel wheels 38 are housed inside the body part 22 as illustrated in FIG. 13B.

More specifically, the cam driving motor 58 is rotated to linearly move the translation cams 50a, 50b to make a change to a state in which the cam follower 37 of the X-direction travel mechanism 25 falls in the valley part 53b, and the cam followers 86 of the Y-direction travel mechanism 26 climb onto the highland parts 52a, 52b as illustrated in FIG. 9(b).

In the present embodiment, there is a state in which the X-direction travel wheels 38 and the Y-direction travel wheels 48 are all set down on the linear travel passage 10C during a change from a state in which the X-direction travel wheels 38 are set down on the linear travel passage 10C and the Y-direction travel wheels 48 are not set down to a state in which the fir-direction travel wheels 48 are set down on the linear travel passage 10C and the X-direction travel wheels 38 are not set down.

More specifically, in the initial stage of the attitude change, the height of the X-direction travel wheels 38 which are currently set down is not changed, and the Y-direction travel wheels 48 which are currently located at a lifted position are lowered. Then, the Y-direction travel wheels 48 located at the lifted position are lowered and landed. Then, the X-direction travel wheels 38 which are currently set down start moving up and move away from the linear travel passage 10C. Thus, when the travel wheels 38, 48 to be landed are switched, the height of the article moving device 3 is not changed, and power required for lifting and lowering the article moving device 3 is small. Further, it is enough to include the small cam driving motor 58 for lifting and lowering the travel wheels 38, 48.

Then, the geared motor of the Y-direction travel device (driving side) 82 is energized to rotate the Y-direction travel wheels 48. As a result, the article moving device 3 travels on the second sub travel passage 10D.

Further, the number of rotations of the Y-direction travel wheels 48 is counted. The travel distance of the article moving device 3 is calculated by adding up the number of rotations. When the article moving device 3 reaches the intersection 120D between the second sub travel passage 10D and the first main travel passage 10A, the Y-direction travel wheels 48 are stopped.

Then, the travel wheel lifting and lowering units 40 are caused to function to make a return to a state in which the X-direction travel wheels 38 are exposed under the article moving device 3 and landed on the first main travel passage 10A of the floor 11, and the Y-direction travel wheels 48 are housed inside the body part 22 as illustrated in FIG. 13A.

More specifically, the cam driving motor 58 is rotated to linearly move the translation cams 50a, 50b to make a change to a state in which the cam follower 37 of the X-direction travel mechanism 25 is located on the highland part 52a, and the cam followers 86 of the Y-direction travel mechanism 26 fall into the valley parts 53a, 53b so that the X-direction travel wheels 38 of the X-direction travel mechanism 25 are landed and the Y-direction travel wheels 48 of the Y-direction travel mechanism 26 are lifted as illustrated in FIG. 9(a).

Also in this case, there is a state in which the X-direction travel wheels 38 and the Y-direction travel wheels 48 are all set down on the linear travel passage 10C during a change from a state in which the Y-direction travel wheels 48 are set down on the linear travel passage 10C and the X-direction travel wheels 38 are not set down to a state in which the X-direction travel wheels 38 are set down on the linear travel passage 10C and the Y-direction travel wheels 48 are not set down.

Then, the X-direction travel wheels 38 are rotated to cause the article moving device 3 to travel on the first main travel passage 10A in a clockwise direction (arrow direction).

Further, the number of rotations of the travel wheels 38 is counted. When the article moving device 3 reaches the front of the section 15A-4, the X-direction travel wheels 38 are stopped.

Then, the article moving device 3 is caused to enter the section 15A-4. That is, the travel wheel lifting and lowering units 40 are caused to function to make a change to a state in which the Y-direction travel wheels 48 are exposed under the article moving device 3 and landed on the floor 11, and the X-direction travel wheels 38 are housed inside the body part 22 as illustrated in FIG. 13B.

Then, the Y-direction travel wheels 48 are rotated to move the article moving device 3 toward the section 15A-4.

Figure 11A:
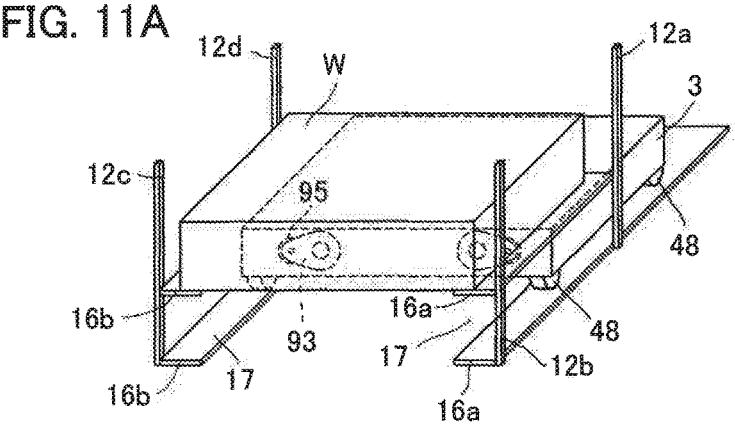
FIGS. 11A to 11D are perspective views illustrating a series of movements in which the article moving device enters a storage area from a travel area, picks up an article in the storage area, and places the article on a holding member.

As described above, the tray part 98 of the holding member 23 is in a lowered state, and the total height of the article moving device 3 is in a low state as illustrated in FIG. 11A.

Figure 11B:
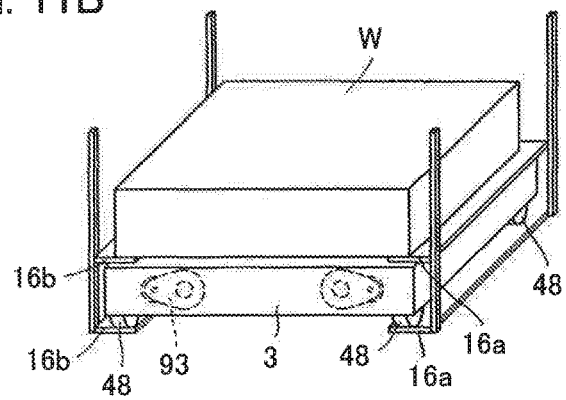

Thus, the article moving device 3 can enter a gap between the floor 11 and the article supporting members 16a, 16b as illustrated in FIG. 11B by rotating the Y-direction travel wheels 48 to move the article moving device 3 toward the section 15A-4.

Figure 11C:
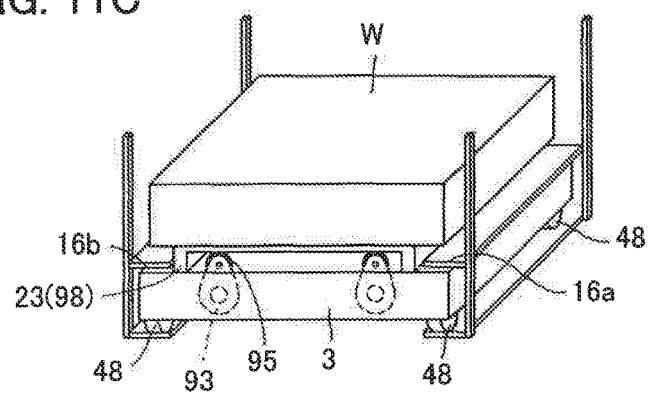

Then, as illustrated in FIG. 11C, the geared motors 92 of the article lifting and lowering units 27 are rotated to rotate the cam members 93 so that the short rollers 95 each of which is a part of the cam move upward and abut against the bottom of the tray part 98 to push up the holding member 23.

As a result, the tray part 98 of the holding member 23 moves upward and projects above the article supporting members 16a, 16b through the gap between the right and left article supporting members 16a, 16b, and picks up the article W placed on the article supporting members 16a, 16b.

Figure 11D:
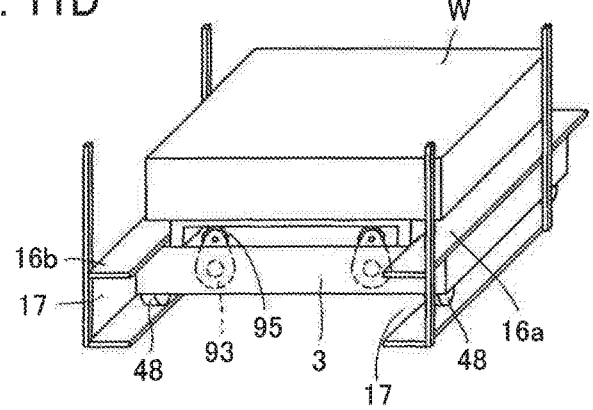

Then, in this state, the Y-direction travel wheels 48 are reversely rotated to move the article moving device 3 toward the first main travel passage 10A from the section 15A-4 so as to move the article moving device 3 out of the section 15A-4 as illustrated in FIG. 11D.

Figure 12A:
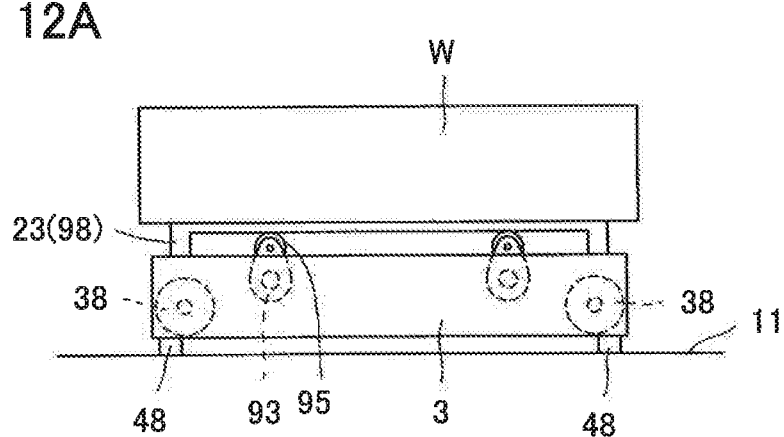
FIGS. 12A to 12C are explanatory diagrams illustrating a series of movements in which the article moving device returns to the travel area from the storage area and travels in the travel area.
Figure 12B:
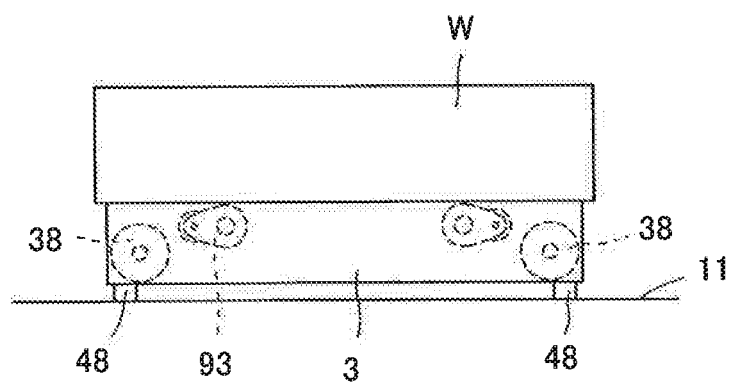
Figure 12C:
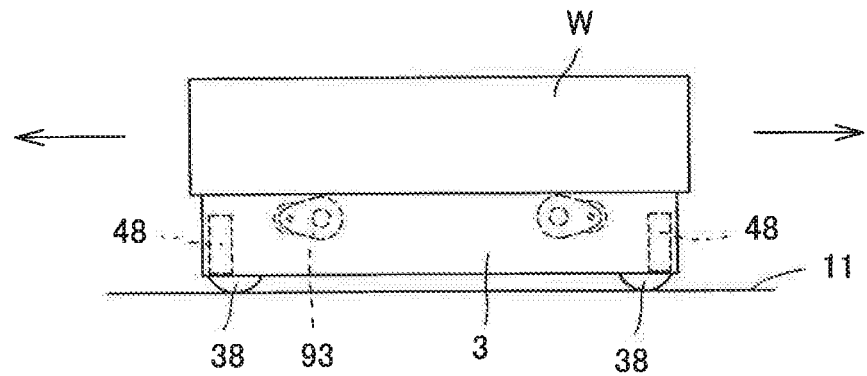

When the entire article moving device 3 has moved to the first main travel passage 10A, as illustrated in FIGS. 12A, 12B, and 12C, the geared motors 92 of the article lifting and lowering units 27 are reversely rotated to reversely rotate the cam members 93 to lower the short rollers 95 so as to lower the tray part 98. Then, the tray part 98 of the holding member 23 is supported by the top face of the body part 22.

Further, in parallel with this, the travel wheel lifting and lowering units 40 are caused to function to make a return to a state in which the X-direction travel wheels 38 are exposed under the article moving device 3 and landed on the second main travel passage 10C of the floor 11, and the Y-direction travel wheels 48 are housed inside the body part 22 as illustrated in FIG. 13C.

Then, the X-direction travel wheels 38 are rotated and caused to travel on the first main travel passage 10A in a clockwise direction. Every time the article moving device 3 reaches the intersection 120, the travel wheel lifting and lowering units 40 are caused to function to switch the travel wheels 38, 48 that contribute to traveling.

Then, the article moving device 3 is moved to the front of the carrying-out lifter 5b and caused to enter the carrying-out lifter 5b, and the article W is transferred onto article supporting members (not illustrated) inside the carrying-out lifter 5b.

A procedure for transferring the article W onto the article supporting members 16a, 16b of the carrying-out lifter 5b is the reverse of the above-described procedure for transferring the article W onto the article moving device 3 from the article supporting members 16a, 16b.

That is, the geared motors 92 of the article lifting and lowering units 27 are rotated in front of the carrying-out lifter 5b to rotate the cam members 93 so that the short rollers 95 each of which is a part of the cam move upward and abut against the bottom of the tray part 98 to push up the holding member 23. As a result, the article W is lifted up, and a gap is formed between the bottom of the article W and the body part 22 of the article lifting and lowering unit 27.

In this state, the article moving device 3 is caused to enter the inside of the gondola 18 of the carrying-out lifter 5b. At this time, the article supporting members 16a, 16b pass through the gap between the bottom of the article W and the body part 22 of the article lifting and lowering unit 27.

Then, the geared motors 92 of the article lifting and lowering units 27 are reversely rotated to lower the holding member 23 so as to put the holding member 23 between two article supporting members (not illustrated) so that the article W is supported by the article supporting members.

When the article W is carried into the rack member 2, the article W is conveyed to a predetermined floor by the carrying-in lifter 5a and discharged from the carrying-in lifter 5a by the article moving device 3. Then, the article moving device 3 is caused to travel and stopped in front of a desired section 15. Then, the article moving device 3 is caused to enter the inside of the section 15, and the article W is transferred onto the article supporting members 16a, 16b inside the section 15.

Further, the article storage apparatus 1 of the present embodiment includes the program for changing the places of articles as described above. This function will be described.

In the article storage apparatus 1 of the present embodiment, the article interchanging operation is executed on the basis of the above program.

The article interchanging operation is performed in a time period when an operation of carrying the article W in and out of the article storage apparatus 1 is not performed, for example, in the nighttime.

When the order of carrying out the articles W is known, the article interchanging operation changes sections where the articles W are stored in accordance with the order.

That is, in the article storage apparatus 1 of the present embodiment, the article moving device 3 travels only in a clockwise direction. Thus, as in the above example, when the articles W from the section 15A-1 through the section 15A-5 which face the first main travel passage 10A are carried out, the article moving device 3 travels on three-quarter or more of the travel passage until the article moving device 3 reaches the carrying-out lifter 5b from the sections 15.

Further, as in the above example, when the position where the article moving device 3 is on standby is far from the section 15 where an article is stored, the article moving device is required to travel a long distance.

Thus, in the article storage apparatus 1 of the present embodiment, when the order of carrying out the articles W is known, articles W whose expected carrying-out time is early are collected before the carrying-out lifter 5b. In the present embodiment, the carrying-out lifter 5b is located near the intersection 120D between the second sub travel passage 10D and the first main travel passage 10A. Thus, the articles W are collected around the sections 15C-1 and 5C-6 before the intersection 120D.

Further, it is recommended that the articles W to be carried out be collected in a lower floor using the lifter 5.

In the embodiment described above, the article moving device 3 is provided for each floor. However, in practice, a plurality of article moving devices 3 are often provided for each floor.

When a plurality of article moving devices 3 are provided, it is recommended that a passing place for the article moving devices 3 be provided in each floor.

In the above embodiment, the travel passage of each floor is a simple single annular travel passage. However, in practice, a plurality of annular travel passages and a connecting passage which connects the annular travel passages may be provided.

Further, it is recommended that a section for charging the storage battery 28 of the article moving device 3 be provided. That is, a specific section 15 is used as a charging section, and a plug is provided in the charging section. Further, a plug is also provided in the article moving device 3. Further, the article moving device 3 is caused to travel by itself so as to move the article moving device 3 to the charging section, and the plug of the article moving device 3 and the plug of the charging section are brought into contact with each other by, for example, magnetic force to charge the storage battery 28.

Further, in the above embodiment, the travel distance of the article moving device 3 is calculated by adding up the number of rotations of the X-direction travel wheels 38 and the Y-direction travel wheels 48. However, a sensor may be provided in each section, and the position of the article moving device 3 may be acquired by a detection signal of the sensor. Further, sensors may be provided not in the respective sections, but at certain intervals.

Further, it is desired to include a sensor which detects that the article moving device 3 has completely entered each section 15.

EXPLANATION OF REFERENCE SIGNS

1: article storage apparatus
2: rack member
3: article moving device
5a, 5b: lifter
7: storage area
10: linear travel passage
13: control device
15: section
16a, 16b: article supporting member
17: in-section travel passage
20: mechanical structure part
22: body part
23: holding member
25: X-direction travel mechanism
26: Y-direction travel mechanism
27: article lifting and lowering unit
28: storage battery
30: receiver
32: X-direction travel device (driving side)
33: X-direction travel device (driven side)
35: swinging member
37: cam follower (cam abutment part)
38: X-direction travel wheel
40: travel wheel lifting and lowering unit
48: Y-direction travel wheel
50a, 50b: translation cam
52a, 52b: highland part
53a, 53b: valley part
55: rack
60a, 60b: pinon gear
82: Y-direction travel device (driving side)
83: Y-direction travel device (driven side)
86: cam follower (cam abutment part)
90: swinging member
92: geared motor
93: cam member
120A, B, C, D: intersection

The invention claimed is:

1. An article storage apparatus comprising:
an article moving device that is self-propelled and that moves an article; and
a rack member on which a plurality of the articles can be placed,
wherein the article moving device comprises:
an X-direction travel wheel with a posture of allowing the article moving device to travel in an X direction, the X-direction travel wheel having at least one travel wheel;
a Y-direction travel wheel with a posture of allowing the article moving device to travel in a Y direction, the Y-direction travel wheel having at least one travel wheel;
travel wheel lifting and lowering units that separately lift and lower the X-direction and Y-direction travel wheels; and
an article lifting and lowering unit that lifts and lowers the article,
at least one wheel of the X-direction travel wheel being rotatable by power,
at least one wheel of the Y-direction travel wheel being rotatable by power,
wherein the rack member comprises:
a travel area having a linear travel passage that linearly extends and supports the X-direction and Y-direction travel wheels when lowered; and
a storage area located beside the linear travel passage, the storage area being divided into a section,
the section comprising:
an in-section travel passage that supports the X-direction and Y-direction travel wheels when lowered; and
an article supporting member disposed above the in-section travel passage,
wherein the article storage apparatus lowers the X-direction travel wheel or the Y-direction travel wheel to set down on the travel passage with a respective travel wheel lifting and lowering unit, then rotating the set-down travel wheel to run the article moving device in either X-direction or Y-direction,
wherein the article storage apparatus lowers either the X-direction travel wheel or the Y-direction travel wheel to set down on the linear travel passage in the travel area, rotating the set-down travel wheel to run the article moving device, stopping the article moving device near a desired one of the sections, changing the set-down travel wheel to another travel wheel to be set down with a respective travel wheel lifting and lowering unit, rotating the another set-down travel wheel to cause the article moving device to enter the section and travel on the in-section travel passage,
thus the article storage apparatus lifting the article lifting and lowering unit to pick up the article on the article supporting member, or lowering the article lifting and lowering unit to transfer the article previously lifted with the article lifting and lowering unit onto the article supporting member,
wherein the travel wheel lifting and lowering unit for one of the X-direction and Y-direction travel wheels comprises: a swinging member that swings around a swinging shaft; and a cam,
the swinging member comprising: a cam abutment part; and a wheel attachment part to which the one of the X-direction and Y-direction travel wheels is attached, and
wherein the cam is brought into contact with the cam abutment part and moved to swing the swinging member for lifting or lowering the one of the X-direction and Y-direction travel wheels attached to the wheel attachment part,
wherein a pressing member is disposed on a back face side of the swinging member and biases the swinging member in a direction that brings the cam abutment part into contact with the cam,
wherein the pressing member is located between an axle of the one of the X-direction and Y-direction travel wheels and the swinging shaft, and
wherein the pressing member presses the swinging member upward, so that the one of the X-direction and Y-direction travel wheels is constantly biased upward.

2. The article storage apparatus according to claim 1, wherein the article moving device comprises a battery and a receiver, and is wirelessly operated.

3. The article storage apparatus according to claim 1, further comprising a layout storage unit that stores a layout of the rack member, wherein the article moving device is moved based on information stored in the layout storage unit.

4. The article storage apparatus according to claim 1,
wherein the travel area comprises an intersection where a plurality of the linear travel passages intersect in an L shape or a cross shape, and
wherein the article storage apparatus is capable of operating the travel wheel lifting and lowering units to change a respective travel wheel to be set down in the intersection and rotating the set-down travel wheel to change a traveling direction of the article moving device.

5. The article storage apparatus according to claim 1,
wherein the travel area comprises an intersection where a plurality of the linear travel passages intersect in an L shape or a cross shape, and
wherein the linear travel passages and the intersection form an annular travel passage in the travel area.

6. The article storage apparatus according to claim 1,
wherein the rack member is provided on a plurality of floors in a height direction,
wherein a lifter moving in an up-down direction is provided, and
wherein the article storage apparatus enables the article moving device to enter the lifter, lifts or lowers the lifter to move to another floor, and rotates the travel wheel to move the article moving device to the rack member on the another floor.

7. The article storage apparatus according to claim 1,
wherein the article lifting and lowering unit comprises: a rotation shaft; and a cam member attached to the rotation shaft, and
wherein the cam member is rotated by rotating the rotation shaft to move a part of the cam member up and down.

8. The article storage apparatus according to claim 1,
wherein the article storage apparatus includes:
a first state where the X-direction travel wheel is set down on the linear travel passage and the Y-direction travel wheel is not set down; and
a second state where the Y-direction travel wheel is set down on the linear travel passage and the X-direction travel wheel is not set down, and
wherein both the X-direction travel wheel and the Y-direction travel wheel are temporarily set down on the linear travel passage during a change from the first state to the second state, or a change from the second state to the first state.

9. An article moving device that is self-propelled and that travels with an article placed thereon, the article moving device comprising:

an X-direction travel wheel with a posture of allowing the article moving device to travel in an X direction, the X-direction travel wheel having at least one travel wheel;

a Y-direction travel wheel with a posture of allowing the article moving device to travel in a Y direction, the Y-direction travel wheel having at least one travel wheel;

travel wheel lifting and lowering units that separately lift and lower the X-direction and Y-direction travel wheels; and an article lifting and lowering unit that lifts and lowers the article, at least one wheel of the X-direction travel wheel being rotatable by power, at least one wheel of the Y-direction travel wheel being rotatable by power, one of the travel wheel lifting and lowering units comprising: a swinging member that swings around a swinging shaft; and a cam, the swinging member comprising: a cam abutment part; and a wheel attachment part to which one of the X-direction and Y-direction travel wheels is attached, wherein the cam is brought into contact with the cam abutment part and moved to swing the swinging member for lifting or lowering the one of the X-direction and Y-direction travel wheels attached to the wheel attachment part, wherein the article moving device lowers the X-direction travel wheel or the Y-direction travel wheel to set down with a respective travel wheel lifting and lowering unit, then rotating the set-down wheel to run the article moving device in either X-direction or Y-direction, and wherein the article moving device lifts the article lifting and lowering unit to pick up the article on another member or lowers the article lifting and lowering unit to transfer the article previously lifted with the article lifting and lowering unit onto the another member, wherein a pressing member is disposed on a back face side of the swinging member and biases the swinging member in a direction that brings the cam abutment part into contact with the cam, wherein the pressing member is located between an axle of the one of the X-direction and Y-direction travel wheels and the swinging shaft, and wherein the pressing member presses the swinging member upward, so that the one of the X-direction and Y-direction wheels is constantly biased upward.

10. The article moving device according to claim 9, wherein the article moving device includes:

a first state where the X-direction travel wheel is lowered to set down and the Y-direction travel wheel is not set down; and a second state where the Y-direction travel wheel is lowered to set down and the X-direction travel wheel is not set down, and wherein both the X-direction travel wheel and the Y-direction travel wheel are temporarily set down during a change from the first state to the second state, and a change from the second state to the first state.

* * * * *